United States Patent
Shekel et al.

(10) Patent No.: US 6,377,733 B2
(45) Date of Patent: Apr. 23, 2002

(54) INTEGRATED OPTICS BEAM DEFLECTORS

(75) Inventors: Eyal Shekel, Jerusalem; Eli Rafaeli, Neve Daniel; Yedidya Ariel, Dolev; Guy Matmon, Jerusalem; Daniel Majer, Givat Shmuel, all of (IL)

(73) Assignee: Chiaro Networks LTD, Jerusalem (IL)

( * ) Notice: Subject to any disclaimer, the term of this patent is extended or adjusted under 35 U.S.C. 154(b) by 0 days.

(21) Appl. No.: 09/733,675

(22) Filed: Dec. 8, 2000

Related U.S. Application Data

(62) Division of application No. 09/350,024, filed on Jul. 9, 1999.

(51) Int. Cl.[7] .................................................. G02B 6/30
(52) U.S. Cl. ........................................................ 385/49
(58) Field of Search ........................ 385/31, 40, 43–52, 385/80–96, 197, 111; 369/215, 244, 44.14, 44.37, 112, 44.19, 99, 110; 356/345, 357, 359; 372/50

(56) References Cited

U.S. PATENT DOCUMENTS

| | | | |
|---|---|---|---|
| 5,195,154 A | 3/1993 | Uchida .......................... | 385/88 |
| 5,210,800 A | 5/1993 | Asai et al. ..................... | 385/12 |
| 5,482,585 A | 1/1996 | Ota et al. ..................... | 156/158 |
| 5,485,538 A | * 1/1996 | Bowen et al. ................. | 385/92 |
| 5,559,915 A | 9/1996 | Deveau ......................... | 385/49 |
| 5,570,442 A | 10/1996 | Arii et al. ..................... | 385/46 |
| 5,579,424 A | 11/1996 | Schneider .................... | 385/49 |
| 5,600,741 A | 2/1997 | Hauer et al. .................. | 385/35 |
| 5,600,745 A | 2/1997 | Wuu et al. .................... | 385/49 |
| 5,611,014 A | 3/1997 | Basavanhally ............... | 385/90 |
| 5,625,726 A | 4/1997 | Ichigi ........................... | 385/14 |
| 5,656,120 A | 8/1997 | Ota et al. ..................... | 156/293 |
| 5,703,973 A | 12/1997 | Mettler et al. ................ | 385/14 |
| 5,703,980 A | 12/1997 | MacElwee et al. ........... | 385/49 |
| 5,706,378 A | 1/1998 | Suzuki et al. ................. | 385/49 |
| 5,708,741 A | 1/1998 | DeVeau ....................... | 385/49 |
| 5,712,937 A | 1/1998 | Asawa et al. ................. | 385/49 |
| 5,712,940 A | 1/1998 | Van Roemburg et al. ..... | 385/93 |

(List continued on next page.)

FOREIGN PATENT DOCUMENTS

| WO | WO 98/59276 | 6/1998 |
|---|---|---|

*Primary Examiner*—Akm E. Ullah
(74) *Attorney, Agent, or Firm*—Ladas & Parry

(57) ABSTRACT

This invention discloses an optical device including at least one first substrate defining a multiplicity of optical fiber positioning grooves, a multiplicity of optical fibers fixed in each of said multiplicity of optical fiber positioning grooves on the at least one first substrate, whereby the multiplicity of optical fibers lie in an optical fiber plane and the ends of each of the multiplicity of optical fibers lie substantially in a first predetermined arrangement in the optical fiber plane, a second substrate fixed onto the at least one first substrate such that an edge of the second substrate extends beyond the ends of each of the multiplicity of optical fibers, a lens assembly including a third substrate, and a lens fixed onto the third substrate, the lens assembly being mounted onto the second substrate such that the lens lies in a second predetermined arrangement with respect to the ends of each of the multiplicity of optical fibers, whereby the separation between the lens and the ends of each of the multiplicity of optical fibers is defined in a plane perpendicular to the optical fiber plane to a first degree of accuracy and the separation between the lens and the ends of each of the multiplicity of optical fibers is defined in the optical fiber plane to a second degree of accuracy, less than the first degree of accuracy.

A method for producing an optical device including at least one first substrate defining-a multiplicity of optical fiber positioning grooves is also disclosed.

4 Claims, 31 Drawing Sheets

U.S. PATENT DOCUMENTS

| | | | |
|---|---|---|---|
| 5,721,797 A | | 2/1998 | Basavanhally et al. ........ 385/49 |
| 5,732,173 A | * | 3/1998 | Bylander et al. .............. 385/49 |
| 5,732,181 A | | 3/1998 | Engberg et al. ............. 385/139 |
| 5,737,138 A | | 4/1998 | Someno ....................... 359/900 |
| 5,745,265 A | * | 4/1998 | Hasegawa et al. ............. 359/15 |
| 5,761,178 A | * | 6/1998 | Fukakusa et al. ........... 369/112 |
| 5,784,509 A | | 7/1998 | Yamane et al. ................ 385/49 |
| 5,828,800 A | | 10/1998 | Henry et al. ................... 385/20 |
| 5,793,914 A | | 11/1998 | Sasaki .......................... 385/49 |
| 5,835,659 A | | 11/1998 | Ota et al. ................... 385/137 |
| 5,854,867 A | | 12/1998 | Lee et al. ...................... 385/49 |
| 5,854,868 A | | 12/1998 | Yoshimura et al. ........... 385/50 |
| 5,859,945 A | | 1/1999 | Kato et al. .................... 385/89 |
| 5,867,619 A | | 2/1999 | Jarek et al. .................... 385/52 |
| 5,875,274 A | | 2/1999 | Stein ............................. 385/49 |
| 5,881,190 A | | 3/1999 | Harpin et al. ................. 385/49 |
| 5,892,857 A | | 4/1999 | McCallion ...................... 385/1 |
| 5,898,806 A | | 4/1999 | Nishimoto .................... 385/49 |
| 5,907,649 A | | 5/1999 | Acklin et al. ................. 385/49 |
| 5,986,451 A | * | 11/1999 | Kagan ......................... 324/210 |
| 6,081,499 A | * | 6/2000 | Berger et al. ............... 369/112 |
| 6,226,424 B1 | * | 5/2001 | Ball et al. ..................... 385/14 |

* cited by examiner

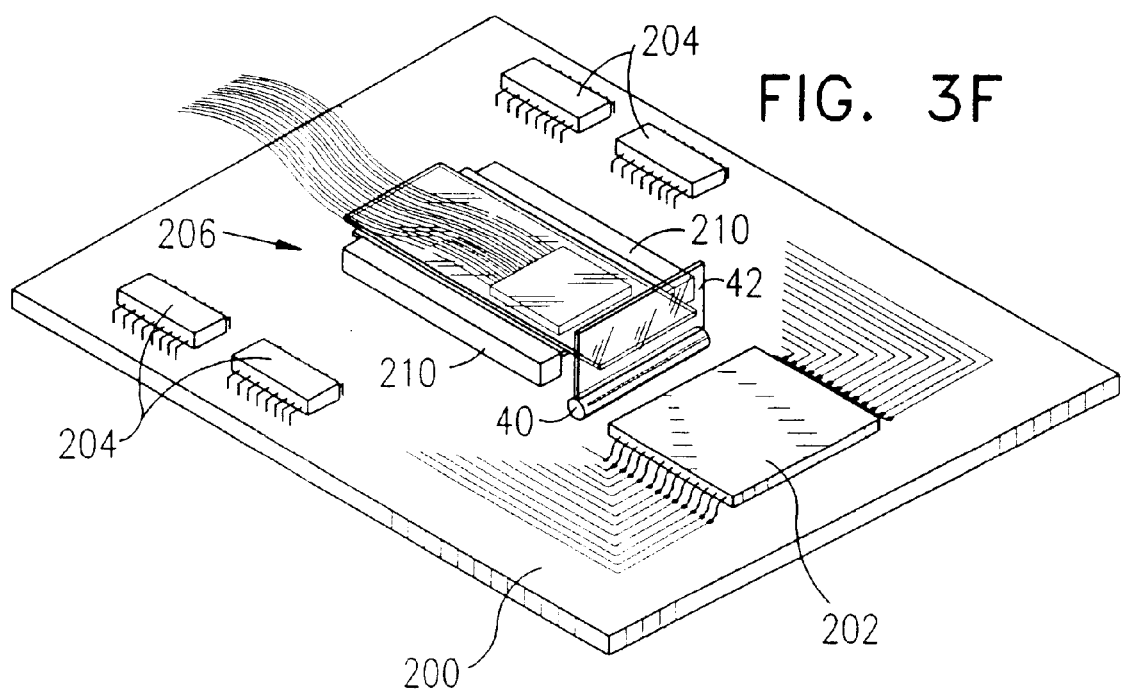

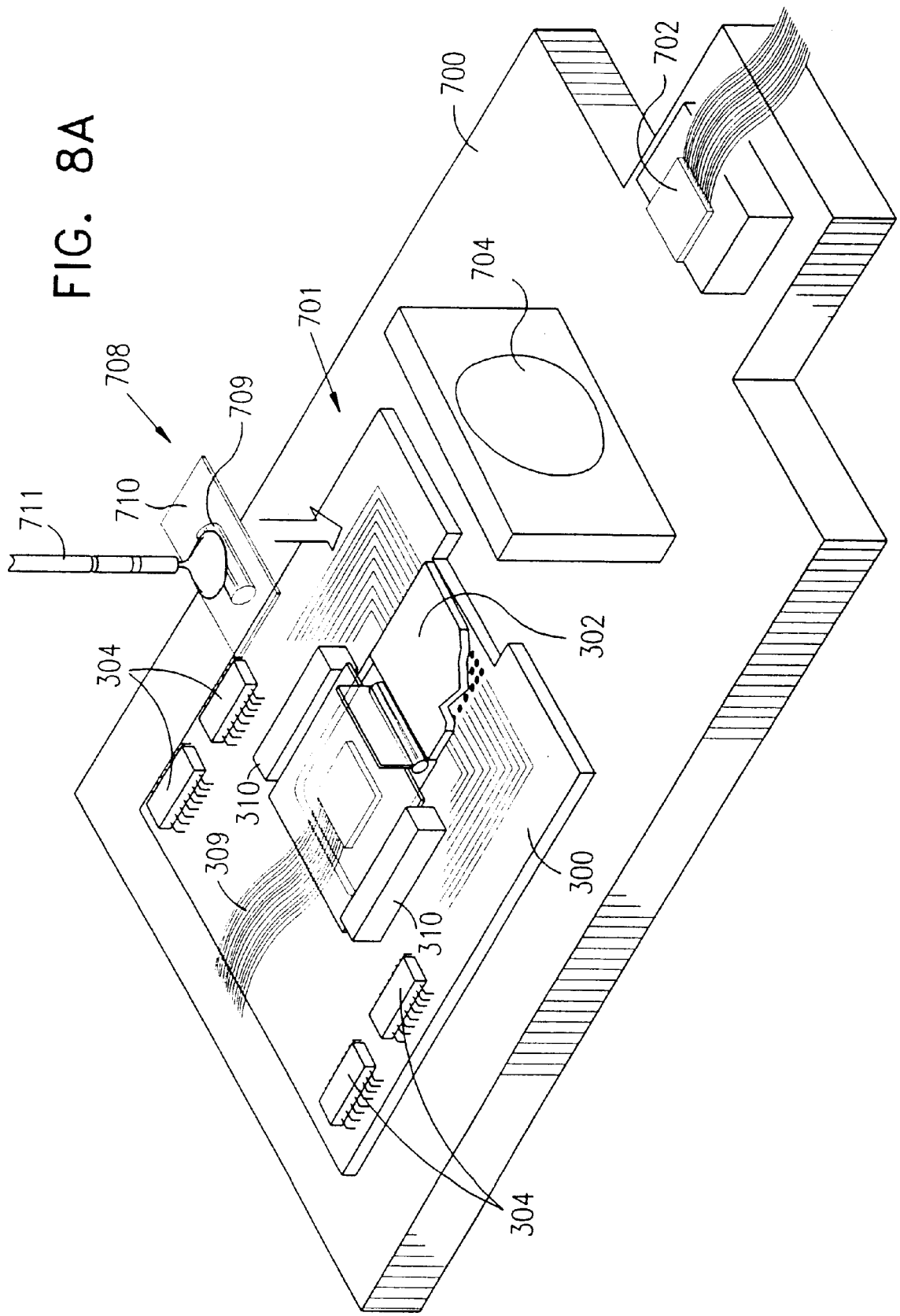

INTEGRATED OPTICS BEAM DEFLECTORS

This application is a Divisional of Ser. No. 09/350,024 filed on Jul. 9, 1999, now allowed.

FIELD OF THE INVENTION

The present invention relates to integrated optical devices generally and more particularly to packaging of integrated optical devices.

BACKGROUND OF THE INVENTION

Various types of integrated optical devices are known. It is well known to pigtail an optical fiber onto an integrated optical device. Difficulties arise, however, when it is sought to pigtail multiple optical fibers onto integrated optical devices. When the optical modes in waveguides and optical fibers are similar, it is conventional to pigtail them by suitable alignment and butt coupling in an integrated optical device.

When there exists a substantial disparity in the respective optical modes of the optical fibers and the waveguides, optical elements must be employed to enable successful pigtailing. Particularly when the optical modes are relatively small, very high alignment accuracy is required in the alignment of three elements, the waveguide, the optical element and the fiber.

The following U.S. Pat. Nos. are believed to representative of the present state of the art: 5,737,138; 5,732,181; 5,732,173; 5,721,797; 5,712,940; 5,712,937; 5,703,973; 5,703,980; 5,708,741; 5,706,378; 5,611,014; 5,600,745; 5,600,741; 5,579,424; 5,570,442; 5,559,915; 5,907,649; 5,898,806; 5,892,857; 5,881,190; 5,875,274; 5,867,619; 5,859,945; 5,854,868; 5,854,867; 5,828,800; 5,793,914; 5,784,509; 5,835,659; 5,656,120; 5,482,585; 5,482,585; 5,625,726; 5,210,800; and 5,195,154.

SUMMARY OF THE INVENTION

The present invention seeks to provide a cost-effective and reliable integrated optics packaging technique and optical devices constructed thereby.

There is thus provided in accordance with a preferred embodiment of the present invention an optical device including at least one first substrate defining a multiplicity of optical fiber positioning grooves, a multiplicity of optical fibers fixed in each of the multiplicity of optical fiber positioning grooves on the at least one first substrate, whereby the multiplicity of optical fibers lie in an optical fiber plane and the ends of each of the multiplicity of optical fibers lie substantially in a first predetermined arrangement in the optical fiber plane, a second substrate fixed onto the at least one first substrate such that an edge of the second substrate extends beyond the ends of each of the multiplicity of optical fibers, a lens assembly including a third substrate, and a lens fixed onto the third substrate, the lens assembly being mounted onto the second substrate such that the lens lies in a second predetermined arrangement with respect to the ends of each of the multiplicity of optical fibers, whereby the separation between the lens and the ends of each of the multiplicity of optical fibers is defined in a plane perpendicular to the optical fiber plane to a first degree of accuracy and the separation between the lens and the ends of each of the multiplicity of optical fibers is defined in the optical fiber plane to a second degree of accuracy, less than the first degree of accuracy.

Further in accordance with a preferred embodiment of the present invention the at least one first substrate comprises a pair of first substrates having the optical fiber positioning grooves thereon arranged in mutually facing relationship.

Still further in accordance with a preferred embodiment of the present invention the lens comprises a cylindrical lens which extends along a cylindrical lens axis. Preferably the cylindrical lens axis lies parallel to the optical fiber plane.

Additionally in accordance with a preferred embodiment of the present invention the third substrate is fixed in engagement with the edge of the second substrate by an adhesive. Preferably the third substrate is fixed in engagement with the edge of the second substrate by an adhesive.

Additionally in accordance with a preferred embodiment of the present invention the multiplicity of optical fiber positioning grooves are mutually parallel. Preferably the multiplicity of optical fiber positioning grooves are arranged in a fan arrangement in order to compensate for optical aberrations.

There is also provided in accordance with a preferred embodiment of the present invention a method for producing an optical device including the steps of forming a multiplicity of optical fiber positioning grooves on at least one first substrate, placing each of a multiplicity of optical fibers in each of the multiplicity of optical fiber positioning grooves on the at least one first substrate, retaining each of the multiplicity of optical fibers in each of the multiplicity of optical fiber positioning grooves on the at least one first substrate, such that the multiplicity of optical fibers lie in an optical fiber plane, precisely defining the ends of each of the multiplicity of optical fibers so that they all lie substantially in a first predetermined arrangement, fixing a second substrate onto the at least one first substrate such that an edge of the second substrate extends beyond the ends of each of the multiplicity of optical fibers, fixing a lens onto a third substrate, precisely aligning the third substrate in engagement with the edge of the second substrate such that the lens lies in a second predetermined arrangement with respect to the ends of each of the multiplicity of optical fibers, and fixing the third substrate in engagement with said edge of the second substrate such that the lens lies in a second predetermined arrangement with respect to the ends of each of the multiplicity of optical fibers, whereby the separation between the lens and the ends of each of the multiplicity of optical fibers is defined in a plane perpendicular to the optical fiber plane to a first degree of accuracy and the separation between the lens and the ends of each of the multiplicity of optical fibers is defined in the optical fiber plane to a second degree of accuracy, less than the first degree of accuracy. Preferably the step of fixing the third substrate in engagement with the edge employs an adhesive and the step of precisely aligning the third substrate in engagement with the edge of the second substrate employs an external positioner.

Further in accordance with a preferred embodiment of the present invention the at least one first substrate includes a pair of first substrates having the optical fiber positioning grooves thereon arranged in mutually facing relationship.

Additionally or alternatively the lens includes a cylindrical lens which extends along a cylindrical lens axis. Preferably the precisely aligning step and the fixing step arrange the cylindrical lens such that the cylindrical lens axis lies parallel to the optical fiber plane.

Preferably the multiplicity of optical fiber positioning grooves are mutually parallel.

Alternatively accordance with a preferred embodiment of the present invention the multiplicity of optical fiber positioning grooves are arranged in a fan arrangement in order to compensate for optical aberrations.

There is further provided in accordance with a preferred embodiment of the present invention an optical device including at least one optical substrate having formed thereon at least one waveguide, at least one base substrate onto which the at least one optical substrate is fixed, and at least one optical module, precisely positioned onto each at least one base substrate and fixed thereto by means of side mounting blocks thereby to preserve precise mutual alignment of the at least one module and the at least one waveguide.

Further in accordance with a preferred embodiment of the present invention the at least one optical module includes a lens or includes a cylindrical lens, and at least one optical fiber.

Preferably the at least one optical module also includes a lens which is operative to couple light from the at least one fiber to the at least one waveguide and also including the step of positioning output optics including at least one output fiber on the at least one base substrate so as to receive light from the at least one waveguide. Additionally or alternatively the lens is operative to couple light from a first number of fibers to a greater number of waveguides.

Additionally in accordance with a preferred embodiment of the present invention the at least one waveguide includes stacking a plurality of base substrates each having mounted thereon at least one optical substrate having formed thereon at least one waveguide and wherein the step of positioning the output optics includes arranging at least one lens to receive light from waveguides formed on multiple ones of the plurality of optical substrates. Preferably the step of positioning the output optics includes employing side mounting blocks thereby to preserve precise mutual alignment of said at least one lens and the at least one waveguide.

Still further in accordance with a preferred embodiment of the present invention the step of positioning output optics includes employing side mounting blocks thereby to preserve precise mutual alignment of said at least one lens and said at least one waveguide, and the at least one waveguide includes a multiplicity of waveguides. The step of positioning the output optics includes positioning at least one lens so as to receive light from multiple ones of the multiplicity of waveguides.

Still further in accordance with a preferred embodiment of the present invention the lens is operative to couple light from a first number of fibers to an identical number of waveguides. Preferably the first number of waveguides comprises at least one waveguide.

Still further in accordance with a preferred embodiment of the present invention the at least one optical substrate is a light deflector.

Additionally in accordance with a preferred embodiment of the present invention, the optical device includes output optics receiving light from the at least one waveguide and including at least one output fiber.

Additionally or alternatively the output optics includes at least one lens fixed onto the base substrate by means of side mounting blocks thereby to preserve precise mutual alignment of the at least one lens and the at least one waveguide. The at least one optical substrate may be a light deflector and preferably the at least one optical substrate is formed of gallium arsenide.

Still further in accordance with a preferred embodiment of the present invention the at least one waveguide includes a multiplicity of waveguides and wherein the output optics includes at least one lens receiving light from multiple ones of the multiplicity of waveguides. Additionally or alternatively the output optics includes at least one lens receiving light from waveguides formed on multiple ones of the plurality of optical substrates. Furthermore the at least one optical substrate may be a light deflector.

The output optics may also include at least one lens fixed onto the base substrate by means of side mounting blocks thereby to preserve precise mutual alignment of the at least one lens and the at least one waveguide.

Additionally or preferably the at least one optical substrate is formed of gallium arsenide.

Still further in accordance with a preferred embodiment of the present invention the optical module includes at least one first substrate defining a multiplicity of optical fiber positioning grooves, a multiplicity of optical fibers fixed in each of the multiplicity of optical fiber positioning grooves on the at least one first substrate, whereby the multiplicity of optical fibers lie in an optical fiber plane. The ends of each of the multiplicity of optical fibers may lie substantially in a first predetermined arrangement in the optical fiber plane. A second substrate is preferably fixed on at least one first substrate such that an edge of the second substrate extends beyond the ends of each of the multiplicity of optical fibers, a lens assembly including a third substrate, and a lens fixed onto the third substrate, the lens assembly being mounted onto the second substrate such that the lens lies in a second predetermined arrangement with respect to the ends of each of the multiplicity of optical fibers. The separation between the lens and the ends of each of the multiplicity of optical fibers may be defined in a plane perpendicular to the optical fiber plane to a first degree of accuracy and the separation between the lens and the ends of each of the multiplicity of optical fibers may be defined in the optical fiber plane to a second degree of accuracy, less than the first degree of accuracy.

Further in accordance with a preferred embodiment of the present invention the lens includes a cylindrical lens.

Additionally in accordance with a preferred embodiment of the present invention also including output optics receiving light from the at least one waveguide and including at least one output fiber. Additionally or alternatively the output optics includes at least one lens fixed onto the base substrate by means of side mounting blocks thereby to preserve precise mutual alignment of the at least one lens and the at least one waveguide. Preferably the at least one optical substrate is a light deflector and the at least one optical substrate is formed of gallium arsenide.

Further in accordance with a preferred embodiment of the present invention the at least one waveguide includes multiplicity of waveguides and wherein the output optics includes at least one lens receiving light from multiple ones of the multiplicity of waveguides. Additionally or alternatively the multiplicity of waveguides is formed on a plurality of optical substrates and the output optics includes at least one lens receiving light from waveguides formed on multiple ones of the plurality of optical substrates.

Preferably the at least one optical substrate is a light deflector and the output optics includes at least one lens fixed onto the base substrate by means of side mounting blocks thereby to preserve precise mutual alignment of the at least one lens and the at least one waveguide. The at least one optical substrate may be formed of gallium arsenide.

There is also provided in accordance with a preferred embodiment of the present invention an optical device including at least one optical substrate having formed thereon at least one waveguide having a center which lies in a waveguide plane, a base substrate onto which the at least one optical substrate is fixed and defining at least one optical fiber positioning groove, and at least one optical fiber fixed in the at least one optical fiber positioning groove on the base substrate, whereby a center of the at least one optical fiber lies in a plane which is substantially coplanar with the waveguide plane.

Preferably electrical connections are mounted on the base substrate.

Additionally the at least one optical module is precisely positioned onto the base substrate and fixed thereto by means of side mounting blocks thereby to preserve precise mutual alignment of the at least one module and the at least one waveguide.

Additionally or alternatively the at least one optical substrate is a light deflector.

There is further provided in accordance with a preferred embodiment of the present invention a method for producing an optical device including the steps of forming at least one waveguide onto at least one optical substrate, mounting the at least one optical substrate onto at least one base substrate, and precisely positioning at least one optical module onto the base substrate, including employing side mounting blocks thereby to preserve precise mutual alignment of the at least one module and the at least one waveguide.

Additionally or alternatively the at least one optical module comprises a lens which is preferably a cylindrical lens.

Further in accordance with a preferred embodiment of the present invention the at least one optical module includes at least one optical fiber. Additionally or alternatively the at least one optical module also includes a lens which is operative to couple light from the at least one fiber to the at least one waveguide. Preferably the lens is operative to couple light from a first number of fibers to a greater number of waveguides.

Alternatively the lens is operative to couple light from a first number of fibers to an identical number of waveguides.

Additionally in accordance with a preferred embodiment of the present invention the first number of waveguides includes at least one waveguide.

Still further in accordance with a preferred the at least one optical substrate is a light deflector.

Additionally in accordance with a preferred embodiment of the present invention, the method for producing an optical device also includes the steps of providing output optics receiving light from the at least one waveguide and including at least one output fiber. Furthermore, the output optics may include at least one lens fixed onto the base substrate by means of side mounting blocks thereby to preserve precise mutual alignment of the at least one lens and the at least one waveguide. Additionally or alternatively the at least one optical substrate is a light deflector. Preferably the at least one optical substrate is formed of gallium arsenide.

Still further in accordance with a preferred embodiment of the present invention the at least one waveguide includes a multiplicity of waveguides and wherein the output optics includes at least one lens receiving light from multiple ones of the multiplicity of waveguides.

Further in accordance with a preferred embodiment of the present invention the at least one waveguide includes a multiplicity of waveguides formed on a plurality of optical substrates and wherein the output optics includes at least one lens receiving light from waveguides formed on multiple ones of the plurality of optical substrates. Additionally or alternatively the at least one optical substrate is a light deflector. Preferably the output optics includes at least one lens fixed onto the base substrate by means of side mounting blocks thereby to preserve precise mutual alignment of the at least one lens and the at least one waveguide. Preferably the at least one optical substrate is formed of gallium arsenide.

Still further in accordance with a preferred embodiment of the present invention the optical module includes at least one first substrate defining a multiplicity of optical fiber positioning grooves, a multiplicity of optical fibers fixed in each of the multiplicity of optical fiber positioning grooves on the at least one first substrate, whereby the multiplicity of optical fibers lie in an optical fiber plane and the ends of each of the multiplicity of optical fibers lie substantially in a first predetermined arrangement in the optical fiber plane, a second substrate fixed onto the at least one first substrate such that an edge of the second substrate extends beyond the ends of each of the multiplicity of optical fibers, a lens assembly including a third substrate, and a lens fixed onto the third substrate, the lens assembly being mounted onto the second substrate such that the lens lies in a second predetermined arrangement with respect to the ends of each of the multiplicity of optical fibers, whereby the separation between the lens and the ends of each of the multiplicity of optical fibers is defined in a plane perpendicular to the optical fiber plane to a first degree of accuracy and the separation between the lens and the ends of each of the multiplicity of optical fibers is defined in the optical fiber plane to a second degree of accuracy, less than the first degree of accuracy.

Additionally or alternatively the lens includes a cylindrical lens. Preferably the at least one optical substrate is a light deflector.

Additionally in accordance with a preferred embodiment of the present invention and also including providing output optics receiving light from said at least one waveguide and including at least one output fiber. Additionally or alternatively the output optics includes at least one lens fixed onto the base substrate by means of side mounting blocks thereby to preserve precise mutual alignment of the at least one lens and the at least one waveguide. The at least one optical substrate may be a light deflector and preferably the at least one optical substrate is formed of gallium arsenide.

Still further according to a preferred embodiment of the present invention the at least one waveguide includes a multiplicity of waveguides and wherein the output optics includes at least one lens receiving light from multiple ones of the multiplicity of waveguides.

Further in accordance with a preferred embodiment of the present invention the at least one waveguide includes a multiplicity of waveguides formed on a plurality of optical substrates and wherein the output optics includes at least one lens receiving light from waveguides formed on multiple ones of the plurality of optical substrates. Preferably the at least one optical substrate is a light deflector.

Additionally in accordance with a preferred embodiment of the present invention the output optics includes at least one lens fixed onto the base substrate by means of side mounting blocks thereby to preserve precise mutual alignment of the at least one lens and the at least one waveguide. Preferably the at least one optical substrate is formed of gallium arsenide.

There is also provided in accordance with yet another preferred embodiment of the present invention a method including forming on at least one optical substrate at least one waveguide having a center which lies in a waveguide plane, fixing the at least one optical substrate onto a base substrate and defining on the base substrate at least one optical fiber positioning groove, and fixing at least one optical fiber in the at least one optical fiber positioning groove on the base substrate, whereby a center of the at least one optical fiber lies in a plane which is substantially coplanar with the waveguide plane.

Preferably electrical connections are mounted on the base substrate.

Additionally the at least one optical module is precisely positioned onto the base substrate and fixed thereto by means of side mounting blocks thereby to preserve precise mutual alignment of the at least one module and the at least one waveguide.

Still further in accordance with a preferred embodiment of the present invention the at least one optical substrate is a light deflector. Preferably also including mounting electrical connections on said base substrate.

There is further provided in accordance with another preferred embodiment of the present invention a method for producing an optical device including the steps of lithographically forming a multiplicity of waveguides onto an optical substrate, mounting the optical substrate onto a base substrate, and precisely positioning a fiber optic module, having a multiplicity of optical fiber ends and an optical mode modifying lens, onto the base substrate, including using at least one external positioner, manipulating at least one of the fiber optic module and the base substrate relative to the other such that the mode of each optical fiber matches the mode of at least one corresponding waveguide with relatively low light loss, and fixing the fiber optic module in a desired relative position on the base substrate independently of the external positioner, and disengaging the at least one external positioner from the modulated light source.

Further in accordance with a preferred embodiment of the present invention the step of fixing includes employing side mounting blocks to fix the module in position on the base substrate upon precise mutual alignment of the module and the multiplicity of waveguides.

Still further in accordance with a preferred embodiment of the present invention also including the step of producing a fiber optic module which includes the steps of forming a multiplicity of optical fiber positioning grooves on at least one first substrate, placing each of a multiplicity of optical fibers in each of the multiplicity of optical fiber positioning grooves on the at least one first substrate, retaining each of the multiplicity of optical fibers in each of the multiplicity of optical fiber positioning grooves on the at least one first substrate, such that the multiplicity of optical fibers lie in an optical fiber plane, precisely defining the ends of each of the multiplicity of optical fibers so that they all lie substantially in a first predetermined arrangement, fixing a second substrate onto the first substrate such that an edge of the second substrate extends beyond the ends of each of the multiplicity of optical fibers, fixing a lens onto a third substrate, precisely aligning the third substrate in engagement with the edge of the second substrate such that the lens lies in a second predetermined arrangement with respect to the ends of each of the multiplicity of optical fibers, and fixing the third substrate in engagement with the edge of the second substrate such that the lens lies in a second predetermined arrangement with respect to the ends of each of the multiplicity of optical fibers, whereby the separation between the lens and the ends of each of the multiplicity of optical fibers is defined in a plane perpendicular to the optical fiber plane to a first degree of accuracy and the separation between the lens and the ends of each of the multiplicity of optical fibers is defined in the optical fiber plane to a second degree of accuracy, less than the first degree of accuracy.

Preferably the optical substrate is gallium arsenide and the optical device functions as a switch.

BRIEF DESCRIPTION OF THE DRAWINGS

The present invention will be understood and appreciated more fully from the following detailed description, taken in conjunction with the drawings in which:

FIGS. 3A–3F are simplified pictorial illustrations of a method for producing an optical device using an optical fiber module and an integrated optics waveguide assembly in accordance with a preferred embodiment of the present invention corresponding to FIGS. 2A and 2B;

FIGS. 8A–8D are simplified pictorial illustrations of a method for associating output optics with the optical device of FIG. 4F in accordance with a preferred embodiment of the present invention;

DETAILED DESCRIPTION OF PREFERRED EMBODIMENTS

Reference is now made to FIGS. 1A–1I, which are simplified pictorial illustrations of a method for producing an optical fiber module in accordance with a preferred embodiment of the present invention. The method preferably begins with the provision of a V-grooved substrate, such as substrate 10 in FIG. 1A or substrate 12 in FIG. 1B. The substrate is typically silicon, but may alternatively be silica, glass or any other suitable material.

Figure 1A:
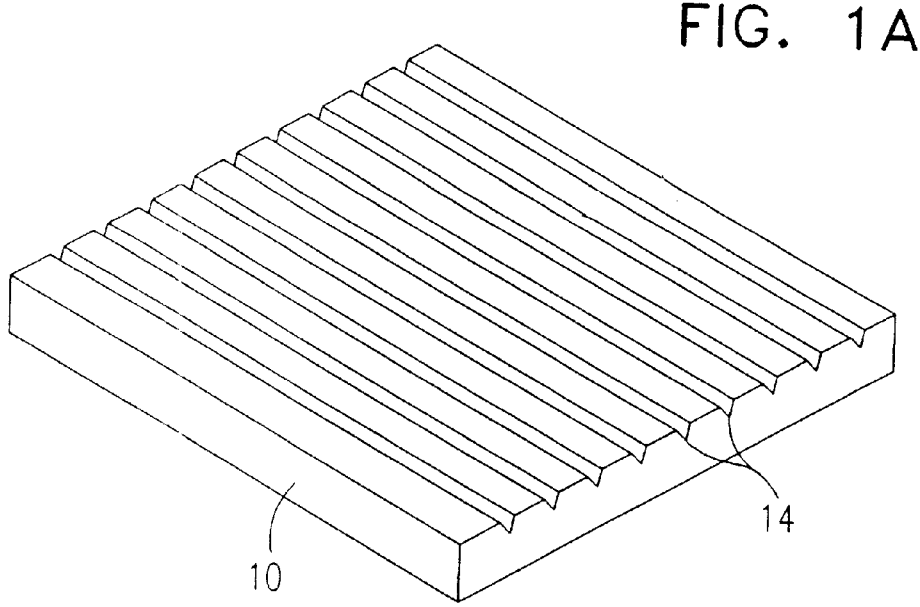
FIGS. 1A–1I are simplified pictorial illustrations of a method for producing an optical fiber module in accordance with a preferred embodiment of the present invention.
Figure 1B:
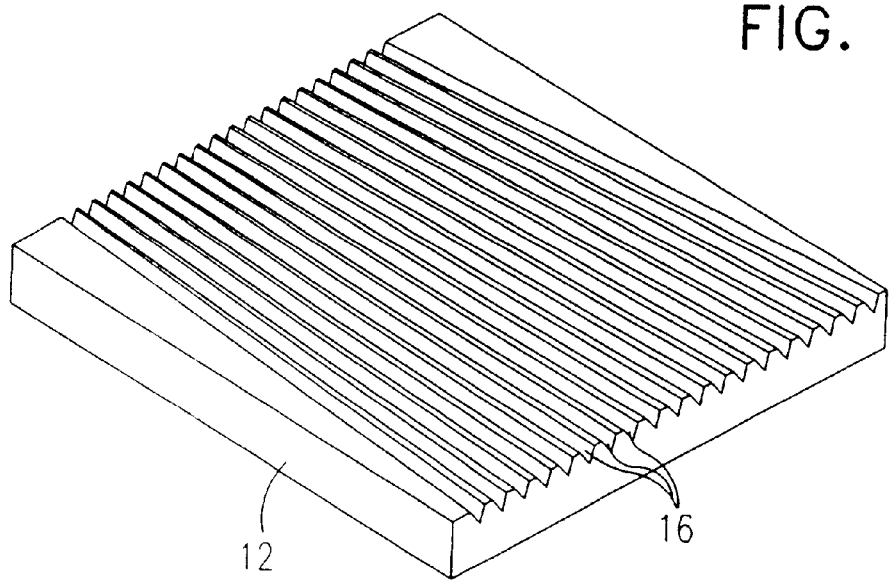

The V-grooves may be parallel as shown in FIG. 1A at reference numeral 14 or non-parallel as shown in FIG. 1B at reference numeral 16. The description that follows refers to a parallel orientation, it being understood that a non-parallel orientation may be employed instead.

Preferably, the V-grooves are formed by lithography or by grinding. The accuracy of the dimensions of the V-grooves is preferably to a fraction of a micron, such that when optical fibers 20 are secured in the V-grooves 22 formed in a substrate 24, as shown in FIG. 1C; their relative alignment is within one-half micron in two dimensions.

Figure 1C:
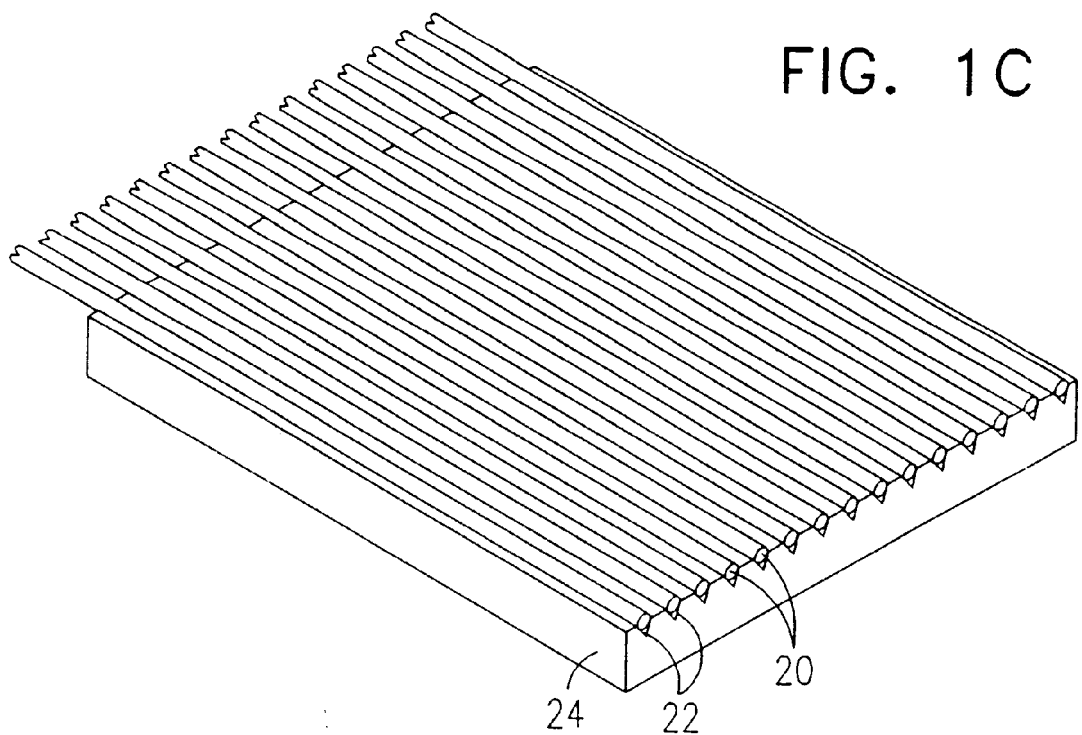
Figure 1D:
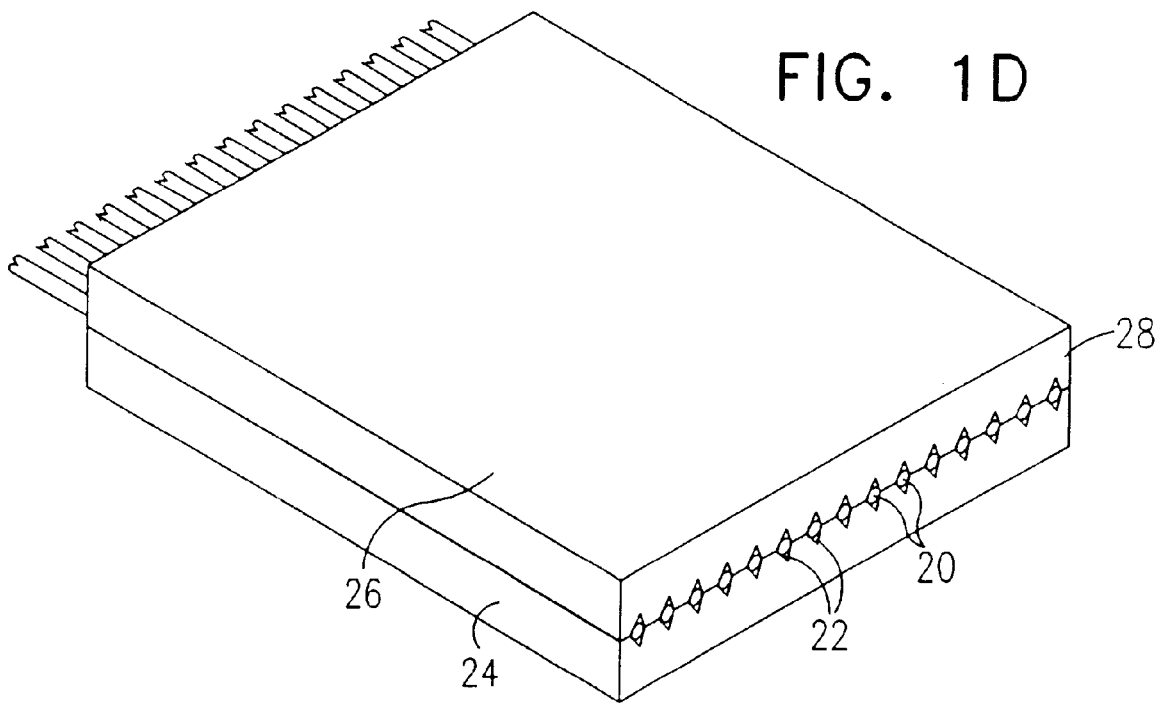

Following placement of the optical fibers 20 in V-grooves 22, as shown in FIG. 1C, the fibers are secured in position by a cover element 26, as shown in FIG. 1D. The cover element 26 may be identical to the V-grooved substrate 24 in an upside down orientation.

It is appreciated that the ends of the optical fibers 20 may all be suitably aligned at the time of their placement in the V-grooves. Preferably, however, this alignment is not required and following placement of the fibers and securing thereof in the V-grooves 22, the fiber ends are cut and polished together with substrate 24 and cover element 26 such that the fiber ends lie in the same plane as the edge of the substrate 24 and cover 26. In FIG. 1D, this plane is indicated by reference numeral 28.

Preferably, suitable adhesive is employed both at the stages shown in FIGS. 1C and 1D to retain the fibers in place and subsequently to hold the cover element 26 onto substrate 24 in secure engagement with fibers 20.

Figure 1E:
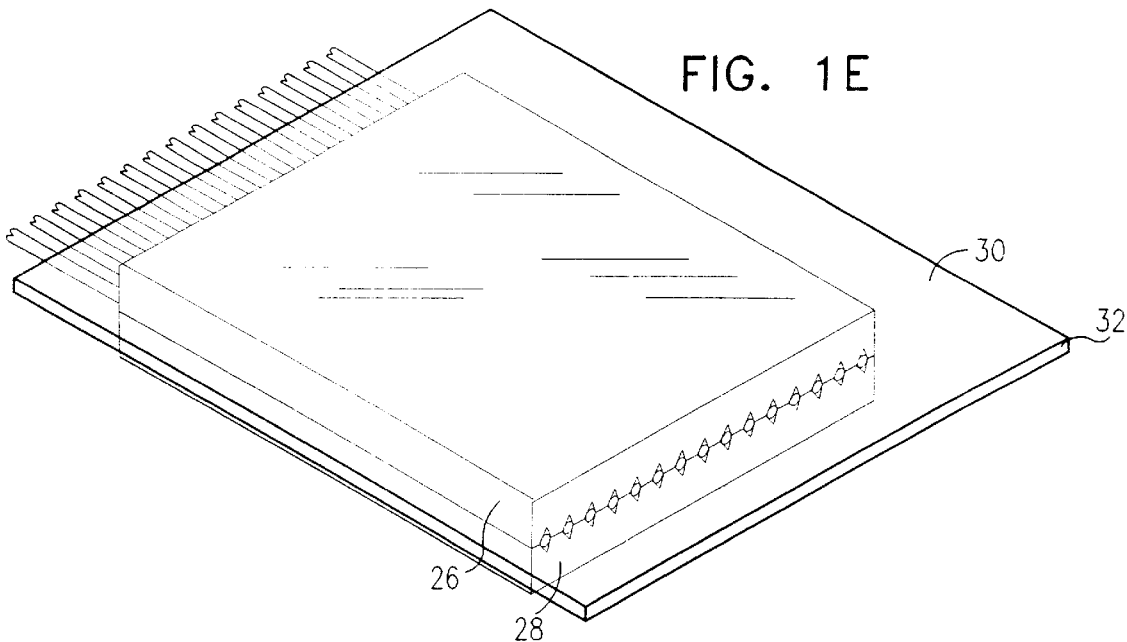
Figure 1F:
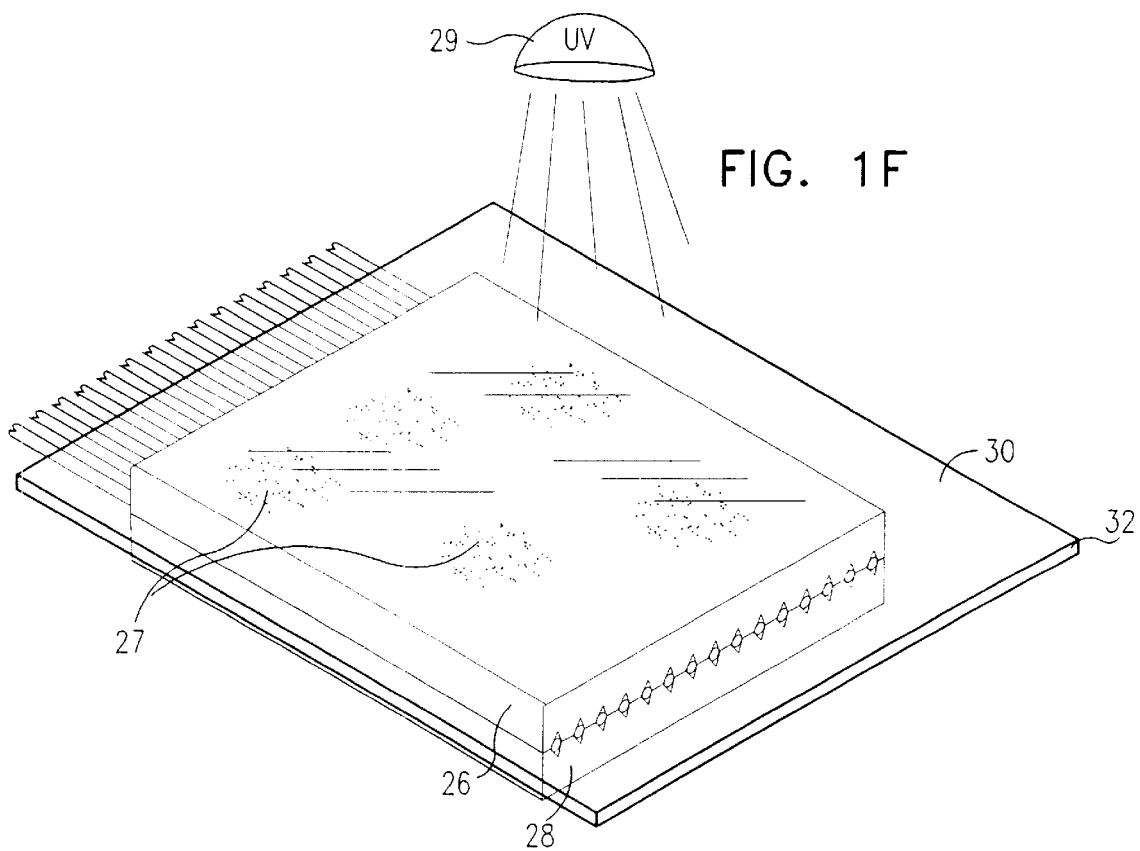

As seen in FIG. 1E, a sheet of glass 30 or any other suitable substrate, which is preferably transparent for ease of alignment, is aligned with cover element 26 such that at least one edge 32 thereof lies in highly accurate parallel alignment with plane 28, and separately therefrom by a precisely determined distance. The substrate 30 is then fixed onto cover element 26, as by means of a UV curable adhesive 27 and a UV light source 29, as shown in FIG. 1F.

Figure 1G:
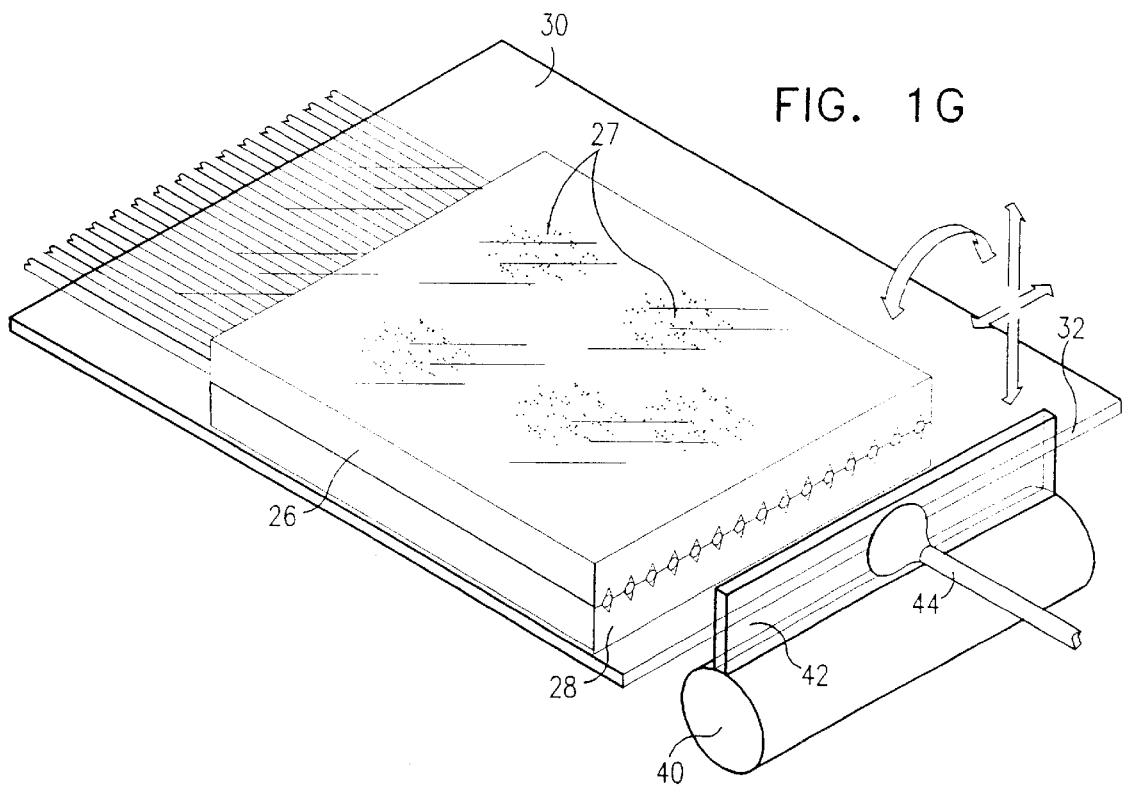
Figure 1H:
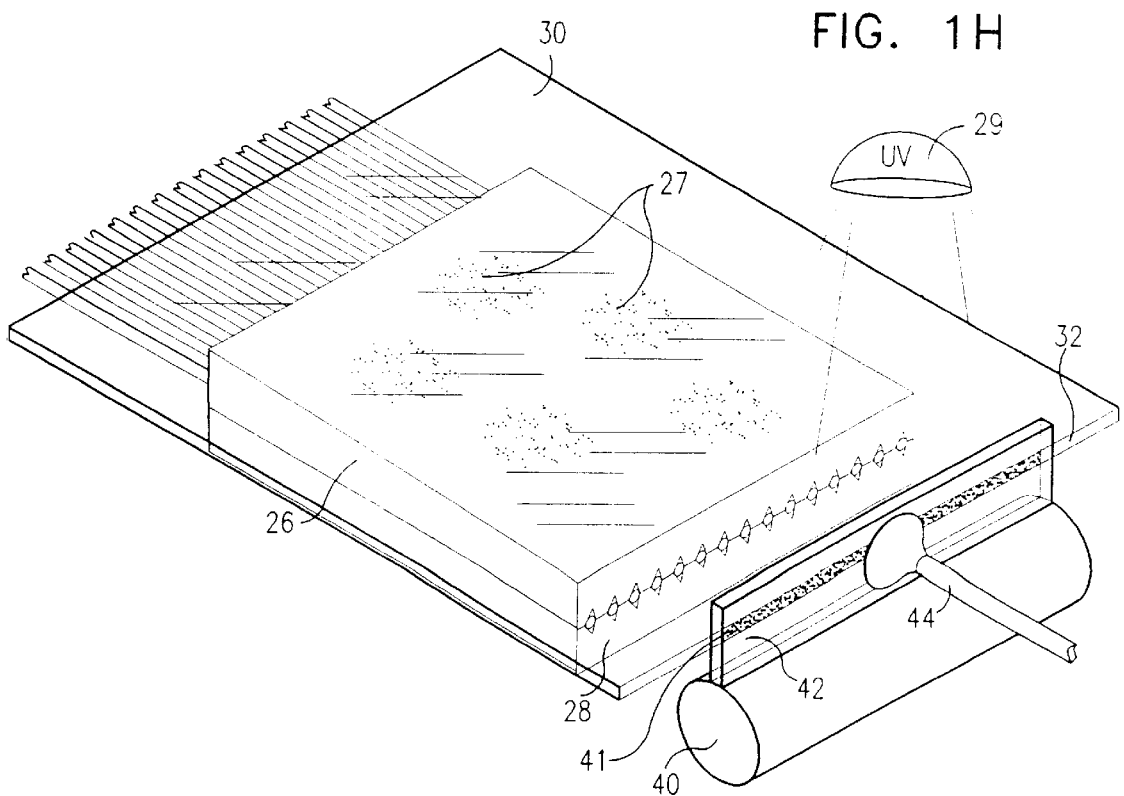

Referring now to FIG. 1G, a lens 40, preferably a cylindrical lens, which is mounted onto a mounting substrate 42, is aligned with respect to edge 32 of substrate 30. This alignment is preferably provided to a high degree of accuracy, to the order of one-half micron, by means of a vacuum engagement assembly 44 connected to a suitable positioner, not shown, such as Melees Grist Nanoblock. This degree of accuracy is greater than that required in the parallelism and separation distance between edge 32 and plane 28. As seen in FIG. 1H, the substrate 42 is then fixed onto edge 32 of substrate 30, as by means of a UV curable adhesive 41 and the UV light source 29.

Figure 1I:
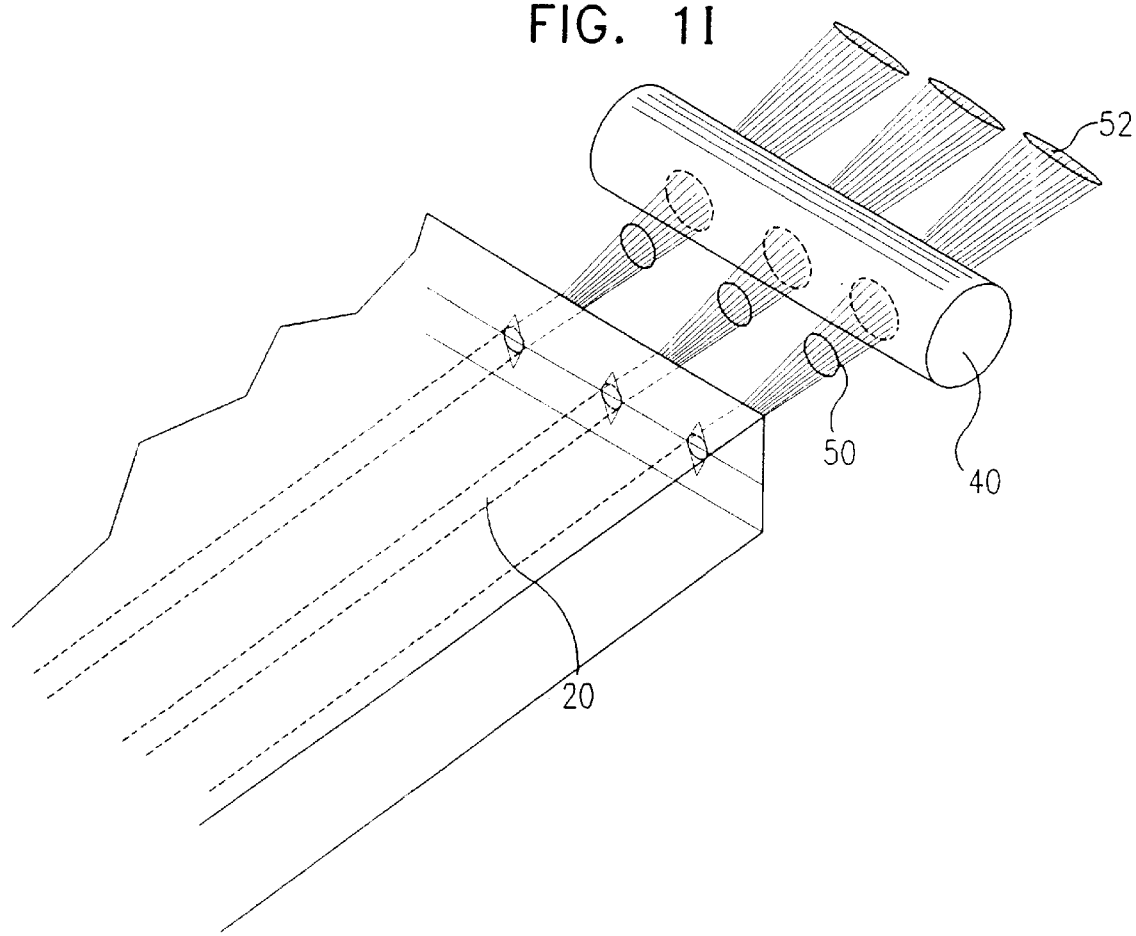

FIG. 1I illustrates the resulting optical relationship between the optical modes 50 of the fibers 20, which are seen to be circular upstream of lens 40 and the optical modes 52 downstream of the lens 40, which are seen to be highly elliptical. It is appreciated that it is a particular advantage of the present invention that the highly elliptical modes which are produced by lens 40 are very similar to whose in integrated optical waveguides, as is described in applicant's published PCT application WO 98/59276. Furthermore, the arrangement described hereinabove produces a mode from a single fiber which is sufficiently highly elliptical so that it may be coupled to a multiplicity of waveguides arranged side by side, as described in applicant's published PCT application WO 98/59276, the contents of which are hereby incorporated by reference. It is appreciated that in accordance with a preferred embodiment of the present invention, lens 40 may couple a single fiber to a single waveguide or to multiple waveguides.

Figure 2A:
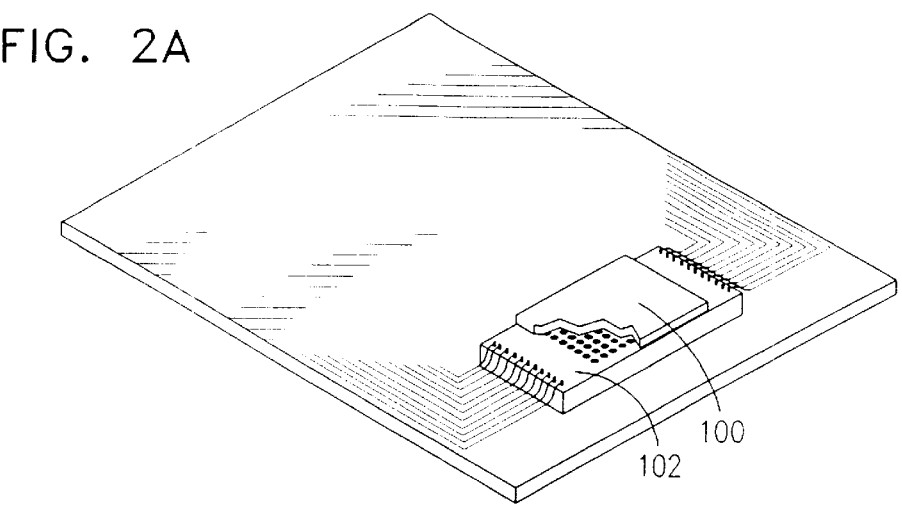
FIGS. 2A–2C are simplified pictorial illustrations of three alternative embodiments of a method for mounting an active integrated optics waveguide assembly onto a base substrate which are useful in the present invention.
Figure 2B:
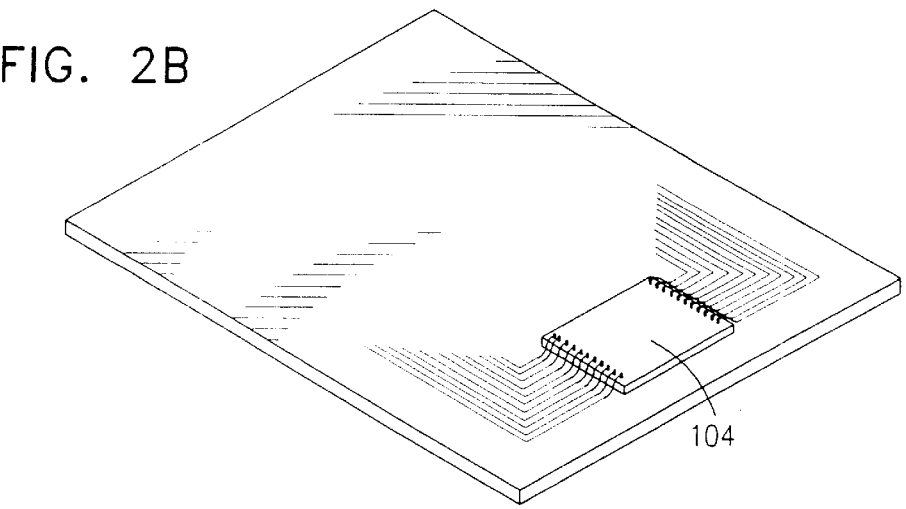
Figure 2C:
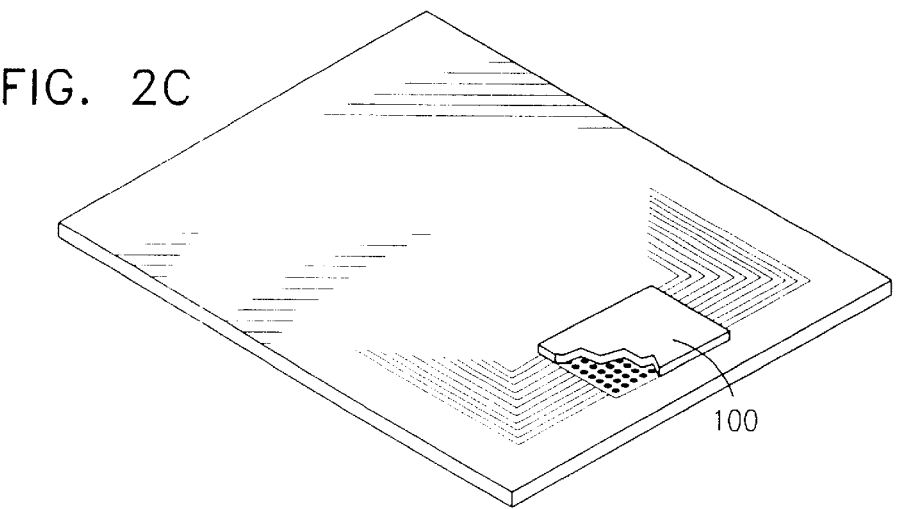

Reference is now made to FIGS. 2A–2C, which are simplified pictorial illustrations of three alternative embodiments of a method for mounting an active integrated optics waveguide assembly onto a base substrate which is useful in the present invention.

FIG. 2A illustrates flip-chip type mounting of an integrated optics waveguide device 100, such as a waveguide device described and claimed in applicant's published PCT application WO 98/59276, the disclosure of which is hereby incorporated by reference. Device 100 is preferably embodied in a flip-chip package, such as that described in FIG. 31 of applicant's published PCT application WO 98/59276. In this embodiment, device 100 is mounted onto an integrated electronic circuit 102, such as an ASIC.

FIG. 2B illustrates conventional wire bond type mounting of an integrated optics waveguide device 104, such as a waveguide device described and claimed in applicant's published PCT application WO 98/59276, the disclosure of which is hereby incorporated by reference. Device 104 is preferably embodied in a wire bond package, such as that described in FIG. 30 of applicant's published PCT application WO 98/59276.

FIG. 2C illustrates conventional flip-chip type mounting of an integrated optics waveguide device 100, such as a waveguide device described and claimed in applicant's published PCT application WO 98/59276, the disclosure of which is hereby incorporated by reference. Device 100 is preferably embodied in a flip-chip package, such as that described in FIG. 31 of applicant's published PCT application WO 98/59276.

The mountings of FIGS. 2A and 2B are both characterized in that the waveguides of the active integrated optics waveguide device are located in a plane which is spaced from the surface of a substrate by a distance of at least a few hundred microns. This may be contrasted from the mounting of FIG. 2C, wherein the waveguides of the active integrated optics waveguide device are located in a plane which is spaced from the surface of a substrate by a distance of less than one hundred microns.

Reference is now made to FIGS. 3A–3F, which are simplified pictorial illustrations of a method for producing an optical device using an optical fiber module and an integrated optics waveguide assembly in accordance with a preferred embodiment of the present invention. The illustrations of FIGS. 3A–3F show a mounting of the type illustrated in FIGS. 2A & 2B.

Figure 3A:
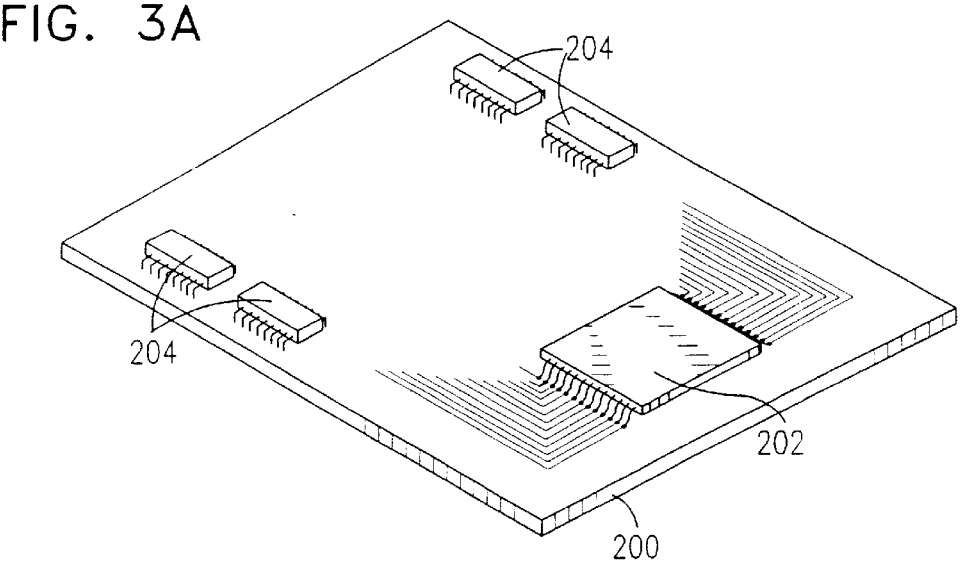
Figure 3B:
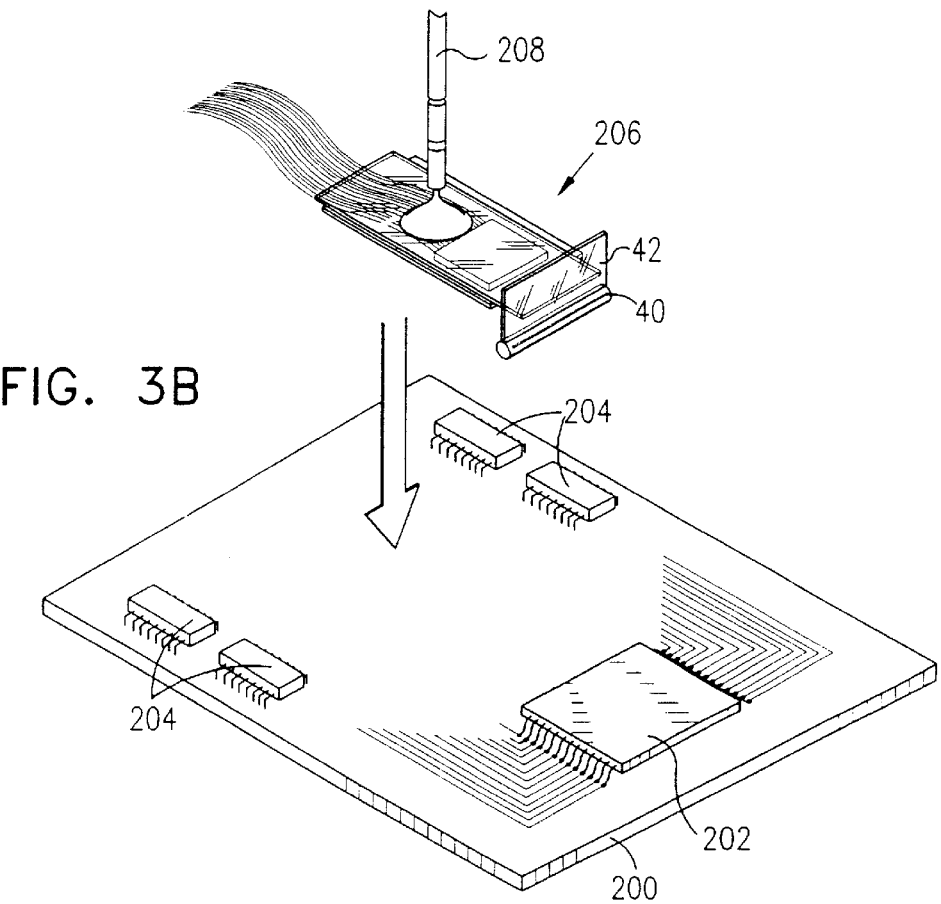

FIG. 3A shows a substrate 200 onto which is mounted an active integrated optics waveguide device 202 as well as various other integrated circuits 204. As seen in FIG. 3B, an optical fiber module 206, preferably of the type described hereinabove with reference to FIGS. 1A–1I, is brought into proximity with substrate 200 and active integrated optics waveguide device 202, as by a vacuum engagement assembly 208, connected to a suitable positioner (not shown), such as Melles Griot Nanoblock.

Figure 3C:
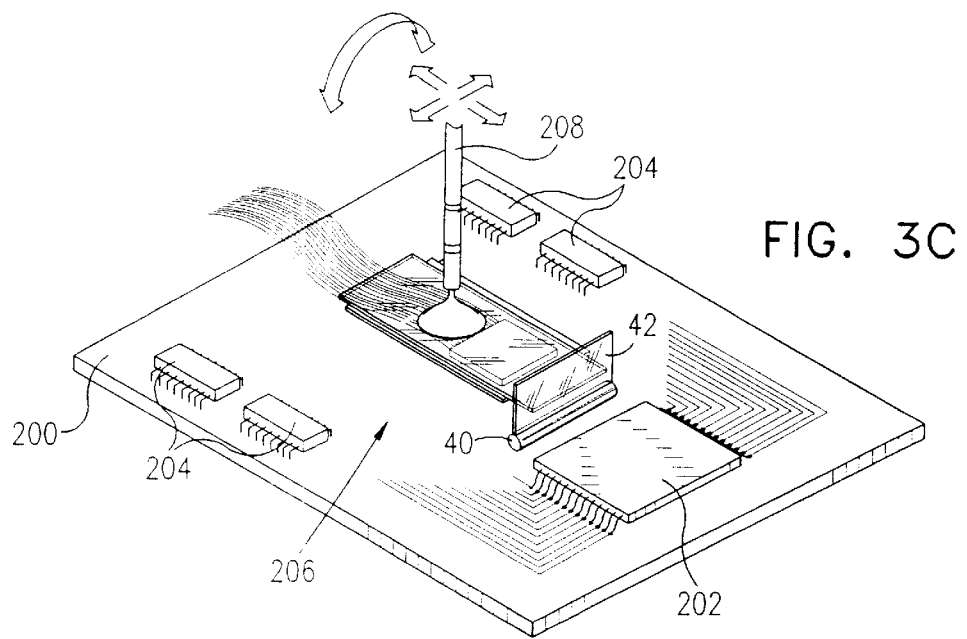

As seen in FIG. 3C, the optical fiber module 206 is precisely positioned with respect to the active integrated optics waveguide device 202 with six degrees of freedom so as to achieve a high degree of accuracy in order to realize optimal optical coupling efficiency between the fibers in module 206 and the waveguides in device 202. This degree of accuracy is greater than that required in the previously described alignment steps illustrated in FIGS. 1A–1I and preferably reaches one tenth of a micron.

Figure 3D:
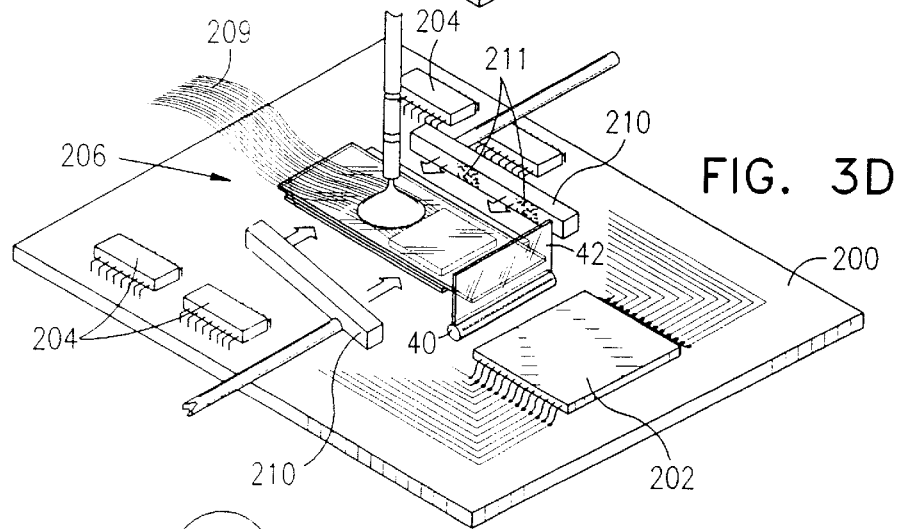

FIG. 3D illustrates precise mounting of the optical fiber module 206 with respect to the active integrated optics waveguide device 202 on substrate 200. This precise mounting is preferably achieved by using the positioner (not shown) to manipulate the fiber optic module 206 relative to substrate 200 such that the mode of each optical fiber 209 in module 206 matches the mode of at least one corresponding waveguide of waveguide device 202 with relatively low light loss.

The fiber optic module 206 is mounted in a desired relative position on the substrate 200 independently of the positioner by employing side mounting blocks 210 to fix the module 206 in position on substrate 200 upon precise mutual alignment of the module 206 and the waveguide device 202.

Figure 3E:
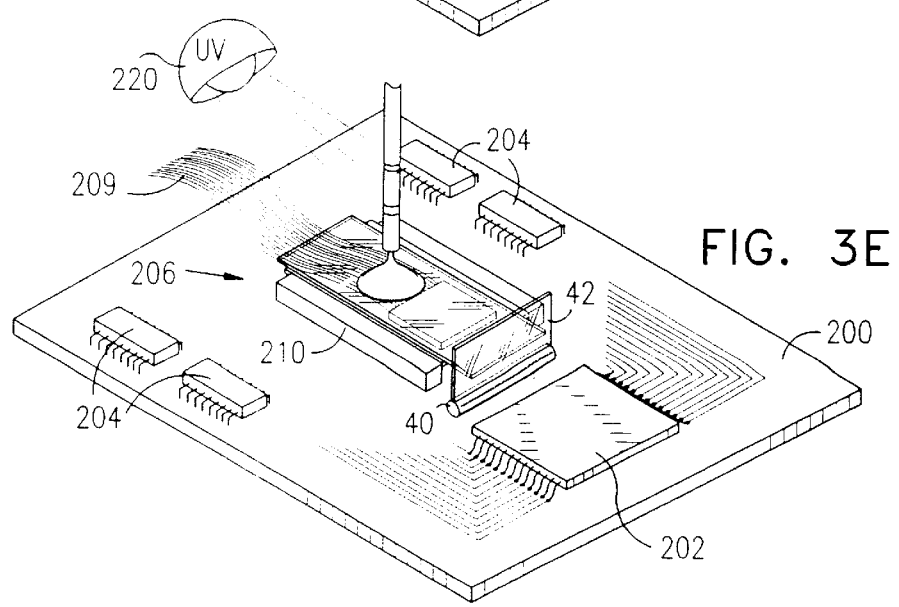

Preferably side mounting blocks 210 are carefully positioned alongside module 206 and are bonded thereto and to substrate 200, preferably using a thin layer of UV curable adhesive 211 which does not involve significant shrinkage during curing, as by use of a UV light source 220 as shown in FIG. 3E, so that the relative position shown in FIG. 3D is preserved, as seen in FIG. 3F. It is appreciated that in order to affix the mounting blocks 210 to the substrate 200, a coating of the adhesive 211 is applied to the appropriate side surfaces and lower surfaces of the mounting blocks 210.

The use of side mounting blocks 210 enables accurate fixation with six degrees of freedom by virtue of the use of the thin layer of adhesive 211, which does not involve significant shrinkage during curing, along two mutually orthogonal planes.

Reference is now made to FIGS. 4A–4F, which are simplified pictorial illustrations of a method for producing an optical device using an optical fiber module and an integrated optics waveguide assembly in accordance with another preferred embodiment of the present invention corresponding to the embodiment of FIG. 2C.

As noted above, in the mounting arrangement of FIG. 2C, the waveguides of the active integrated optics waveguide device are located in a plane which is spaced from the surface of a substrate by a distance of less than one hundred microns. In order to accommodate this very small spacing a hole or a recess is formed in the substrate to receive the optical fiber module.

Figure 4A:
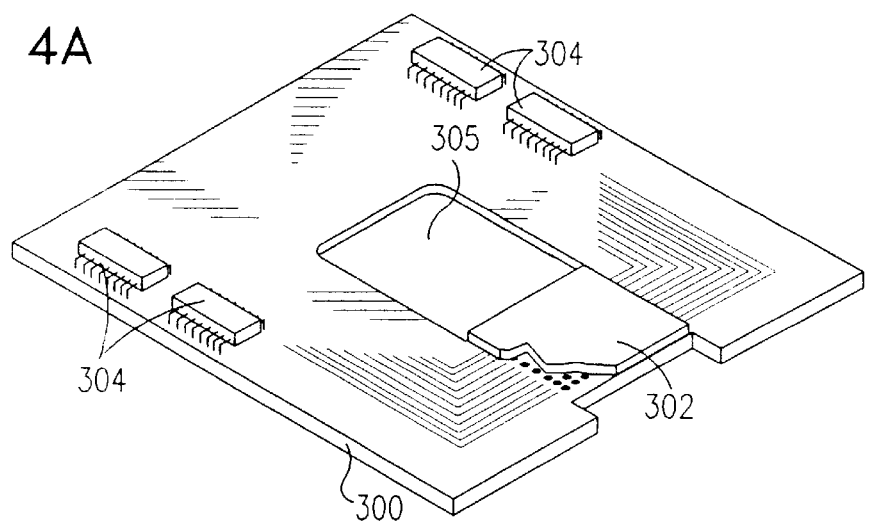
FIGS. 4A–4F are simplified pictorial illustrations of a method for producing an optical device using an optical fiber module and an integrated optics waveguide assembly in accordance with another preferred embodiment of the present invention corresponding to the embodiment of FIG. 2C.
Figure 4B:
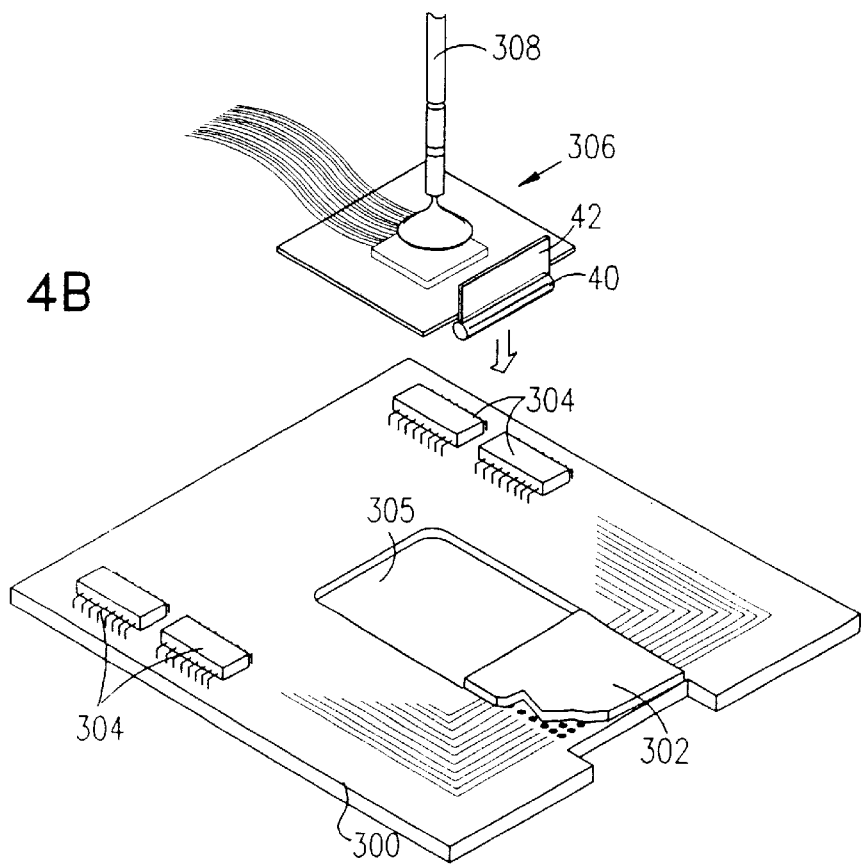

FIG. 4A shows a substrate 300 onto which is mounted an active integrated optics waveguide device 302 as well as various other integrated circuits 304. A hole or recess 305 is preferably formed in substrate 300 as shown. As seen in FIG. 4B, an optical fiber module 306, preferably of the type described hereinabove with reference to FIGS. 1A–1I, is brought into proximity with substrate 300 and active integrated optics waveguide device 302, as by a vacuum engagement assembly 308, connected to a suitable positioner (not shown), such as Melles Griot Nanoblock.

Figure 4C:
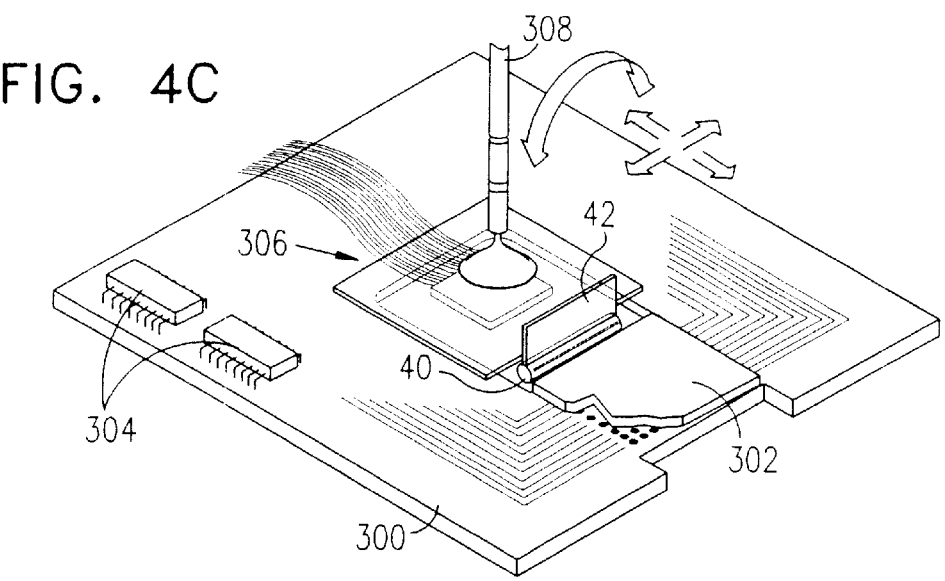

As seen in FIG. 4C, the optical fiber module 306 is precisely positioned with respect to the active integrated optics waveguide device 302 with six degrees of freedom so as to achieve a high degree of accuracy in order to realize optimal optical coupling efficiency between the fibers in module 306 and the waveguides in device 302. This degree of accuracy is greater than that required in the previously described alignment steps illustrated in FIGS. 1A–1I and preferably reaches one tenth of a micron.

Figure 4D:
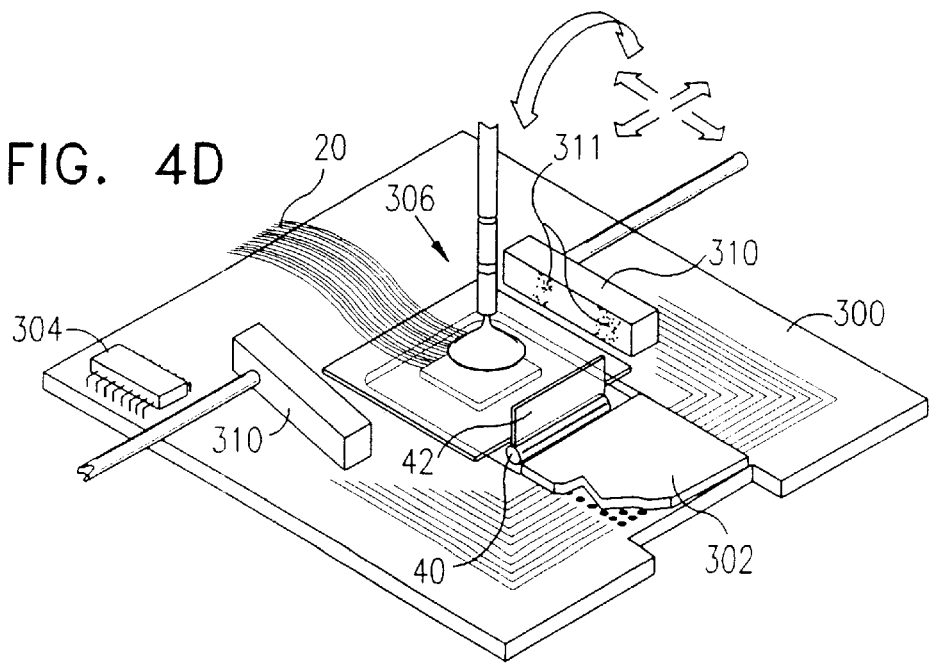

FIG. 4D illustrates precise mounting of the optical fiber module 306 with respect to the active integrated optics waveguide device 302 on substrate 300 partially overlapping hole 305, such that the cylindrical lens, such as lens 40 (FIG. 1H) and the ends of the optical fibers, such as fibers 20 (FIG. 1D) lie partially below the top surface of substrate 300. This construction ensures that the images of the centers of the ends of fibers 20 lie in the same plane as the centers of the waveguides of waveguide device 302. This precise mounting is preferably achieved by using the positioner (not shown) to manipulate the fiber optic module 306 relative to substrate 300 such that the mode of each optical fiber 20 in module 306 matches the mode of at least one corresponding waveguide of waveguide device 302 with relatively low light loss.

The fiber optic module 306 is mounted in a desired relative position on the substrate 302 independently of the positioner by employing side mounting blocks 310 to fix the module 306 in position on substrate 300 upon precise mutual alignment of the module 306 and the waveguide device 302.

Figure 4E:
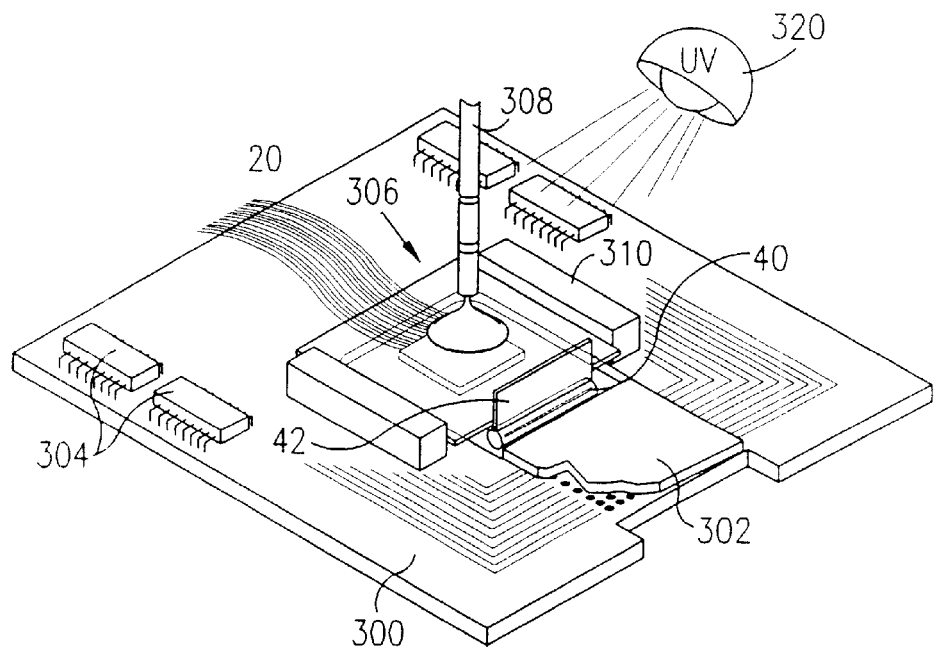
Figure 4F:
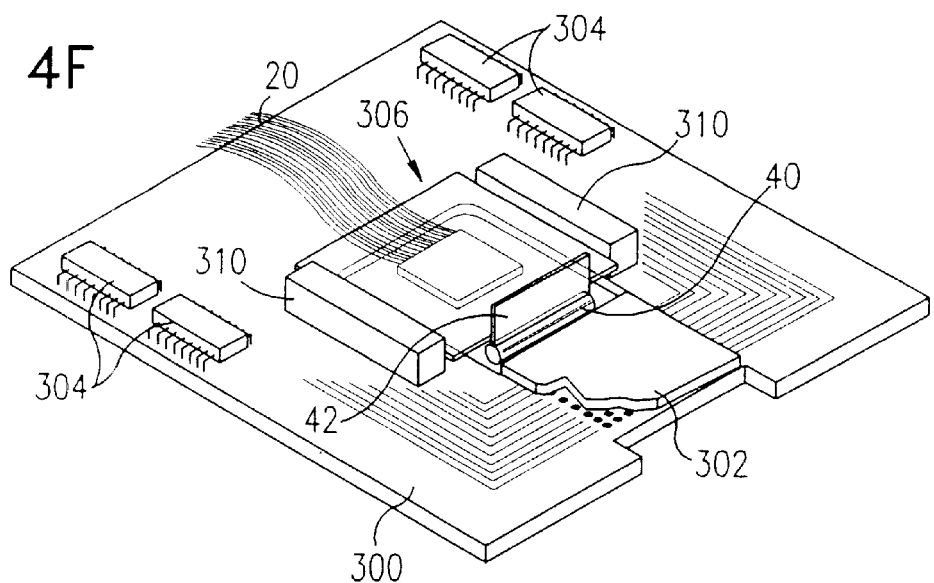

Preferably side mounting blocks 310 are carefully positioned alongside module 306 and are bonded thereto and to substrate 300, preferably using a thin layer of UV curable adhesive 311 which does not involve significant shrinkage during curing, as by use of a UV light source 320 as shown in FIG. 4E, so that the relative position shown in FIG. 4D is preserved, as seen in FIG. 4F.

The use of side mounting blocks 310 enables accurate fixation with six degrees of freedom by virtue of the use of the thin layer of adhesive 311, which does not involve significant shrinkage during curing, along two mutually orthogonal planes.

Reference is now made to FIGS. 5A–5F, which are simplified pictorial illustrations yet another method for producing an optical device using an optical fiber module and an integrated optics waveguide assembly in accordance with yet another preferred embodiment of the present invention corresponding to the embodiment of FIG. 2C.

Figure 5A:
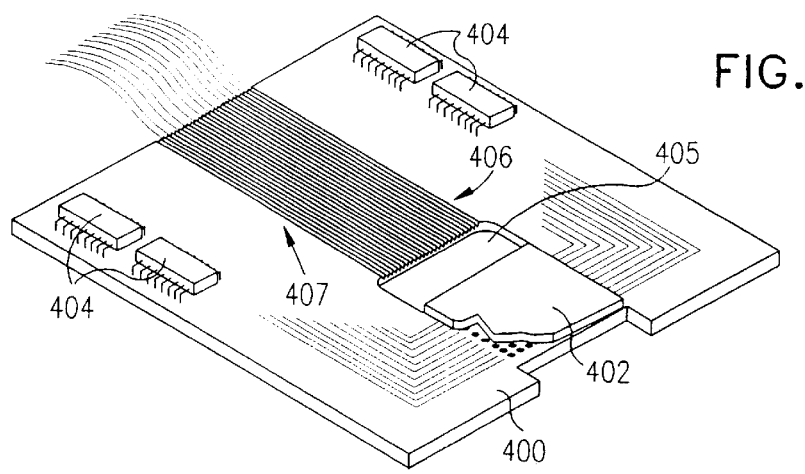
FIGS. 5A–5F are simplified pictorial illustrations of a method for producing an optical device using an optical fiber module and an integrated optics waveguide assembly in accordance with yet another preferred embodiment of the present invention corresponding to the embodiment of FIG. 2C.

FIG. 5A shows a substrate 400 onto which is mounted an active integrated optics waveguide device 402 as well as various other integrated circuits 404. A hole or recess 405 is preferably formed in substrate 400 as shown.

In this embodiment a multiplicity of optical fibers 406 are mounted in V-grooves 407 formed in substrate 400, such that the centers of the ends of fibers 406 all lie in the same plane as that of the centers of the waveguides of waveguide device 402. It is appreciated that this type of structure may be adapted for use with the embodiment of FIGS. 2A and 2B by providing a raised platform portion of substrate 400 underlying V-grooves 407. In such an arrangement, the centers of the ends of fibers 406 would all lie in the same plane as that of the centers of the waveguides of waveguide device 100 (FIG. 2A) or 104 (FIG. 2B).

Figure 5B:
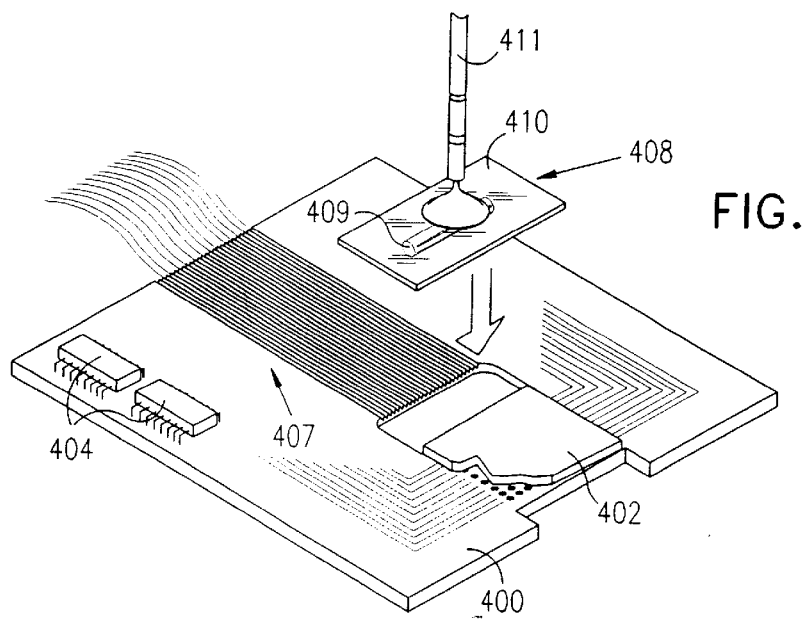

As seen in FIG. 5B, a lens module 408, preferably comprising a lens 409 fixedly mounted onto a mounting substrate 410, is brought into proximity with substrate 400 and active integrated optics waveguide device 402, as by a vacuum engagement assembly 411, connected to a suitable positioner (not shown), such as Melles Griot Nanoblock.

Figure 5C:
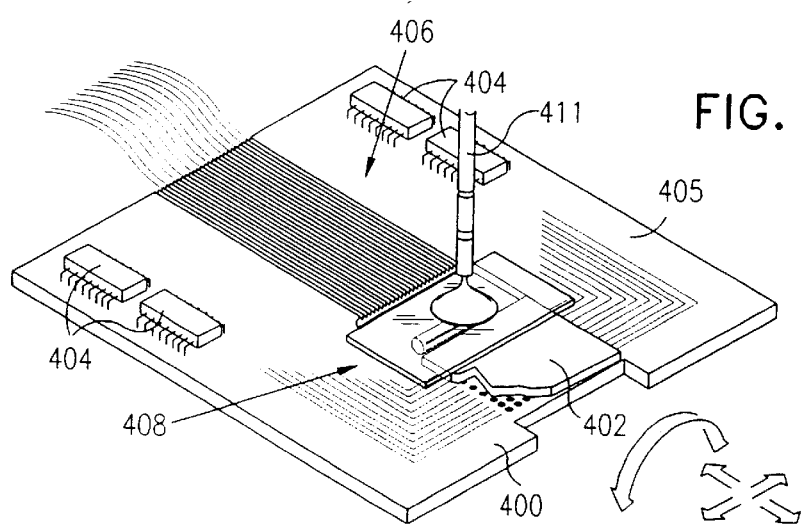

As seen in FIG. 5C, the lens module 408 is precisely positioned with respect to the active integrated optics waveguide device 402 with six degrees of freedom so as to achieve a high degree of accuracy in order to realize optimal optical coupling efficiency between the fibers 406 and the waveguides in device 402. This degree of accuracy is greater than that required in the previously described alignment steps illustrated in FIGS. 1A–1I and preferably reaches one tenth of a micron.

Figure 5D:
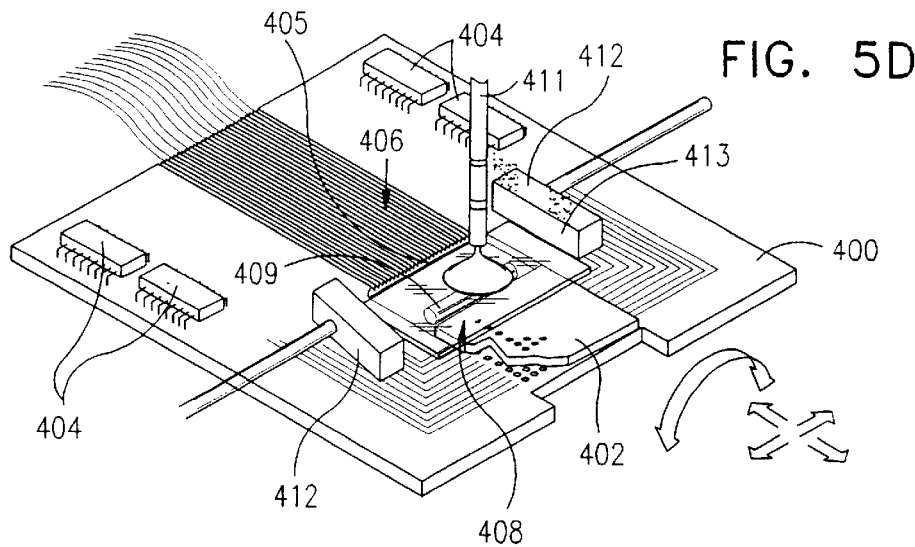

FIG. 5D illustrates precise mounting of the lens module 408 with respect to the active integrated optics waveguide device 402 on substrate 400 partially overlapping hole 405, such that the lens 409 lies partially below the top surface of substrate 400. This construction ensures that the images of the centers of the ends of fibers 406 lie in the same plane as the centers of the waveguides of waveguide device 402. This precise mounting is preferably achieved by using the positioner (not shown) to manipulate the lens module 408 relative to substrate 400 such that the mode of each optical fiber 406 matches the mode of at least one corresponding waveguide of waveguide device 402 with relatively low light loss.

The lens module 408 is mounted in a desired relative position on the substrate 400 independently of the positioner by employing side mounting blocks 412 to fix the module 408 in position on substrate 400 upon precise mutual alignment of the module 408 and the waveguide device 402.

Figure 5E:
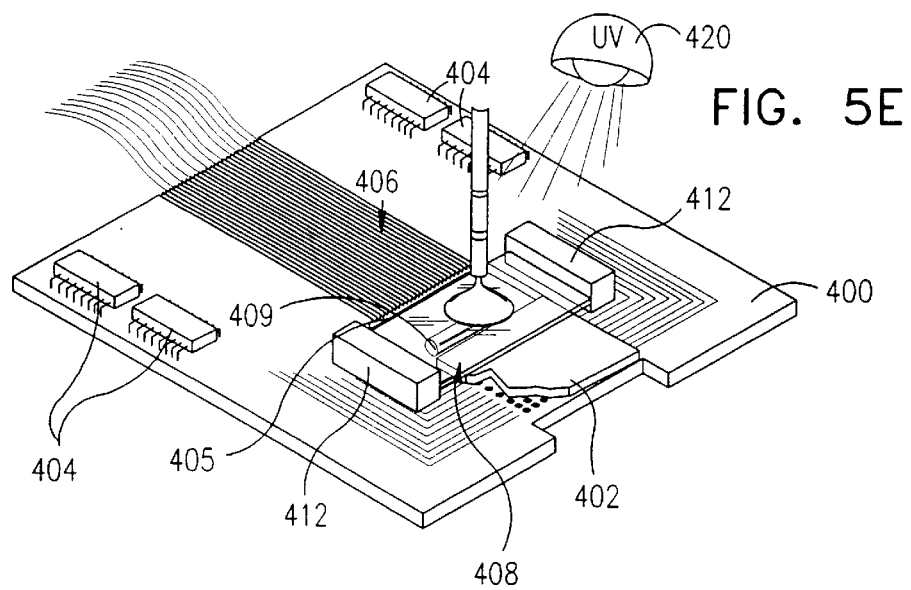
Figure 5F:
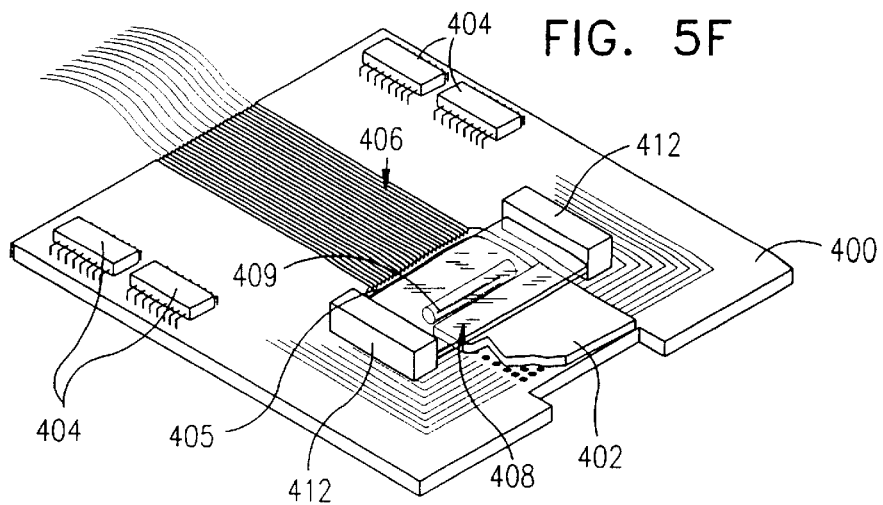

Preferably side mounting blocks 412 are carefully positioned alongside module 408 and are bonded thereto and to substrate 400, preferably using a thin layer of UV curable adhesive 413 which does not involve significant shrinkage during curing, as by use of a UV light source 420 as shown in FIG. 5E, so that the relative position shown in FIG. 5D is preserved, as seen in FIG. 5F.

The use of side mounting blocks 412 enables accurate fixation with six degrees of freedom by virtue of the use of the thin layer of adhesive 413, which does not involve significant shrinkage during curing, along two mutually orthogonal planes.

Figure 6A:
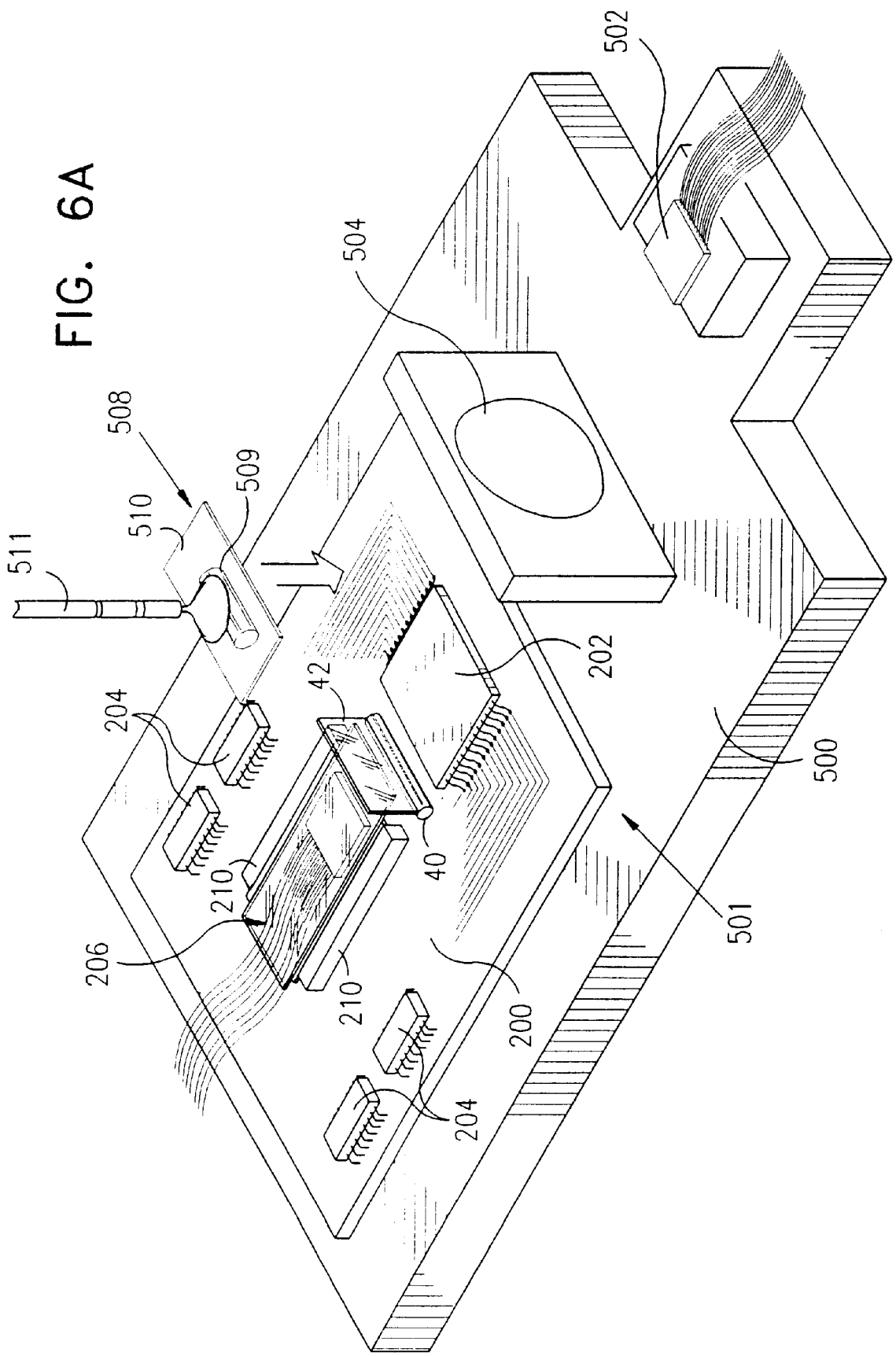
FIGS. 6A–6E are simplified pictorial illustrations of a method for associating output optics with the optical device of FIG. 3F in accordance with a preferred embodiment of the present invention.

Reference is now made to FIGS. 6A–6E, which are simplified pictorial illustrations of a method for associating output optics with the optical device of FIG. 3F in accordance with a preferred embodiment of the present invention;

FIG. 6A shows a chassis 500 onto which is mounted an optical device 501, preferably the optical device described hereinabove and shown in FIG. 3F. For the sake of conciseness and clarity, the reference numerals appearing in FIG. 3F are employed also in FIG. 6A as appropriate. Also mounted on chassis 500 is an optical fiber bundle 502 and a lens 504 arranged such that the center of the lens 504 lies in the same plane as the centers of the ends of the fibers in fiber bundle 502 within conventional mechanical tolerances, such as 10–50 microns.

As seen in FIG. 6A, a lens module 508, preferably comprising a lens 509 fixedly mounted onto a mounting substrate 510, is brought into proximity with substrate 200 of device 501 and active integrated optics waveguide device 202 of device 501, as by a vacuum engagement assembly 511, connected to a suitable positioner (not shown), such as Melles Griot Nanoblock.

Figure 6B:
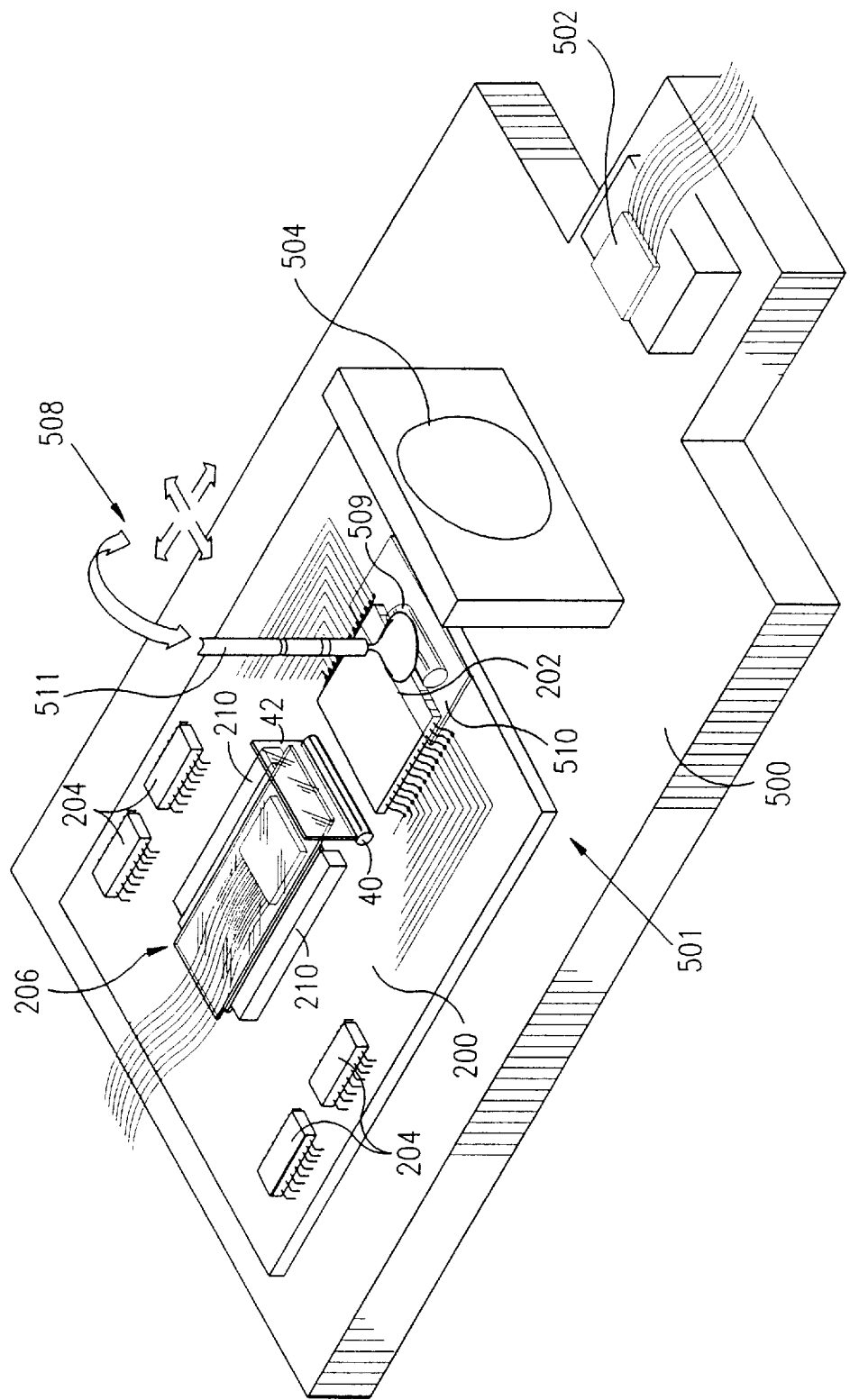

As seen in FIG. 6B, the lens module 508 is precisely positioned with respect to the active integrated optics waveguide device 202 with six degrees of freedom so as to achieve a high degree of accuracy in order to realize optimal optical coupling efficiency between the fibers of fiber bundle 502 and the waveguides in device 202. This degree of accuracy is greater than that required in the previously described alignment steps illustrated in FIGS. 1A–1I and preferably reaches one tenth of a micron.

Figure 6C:
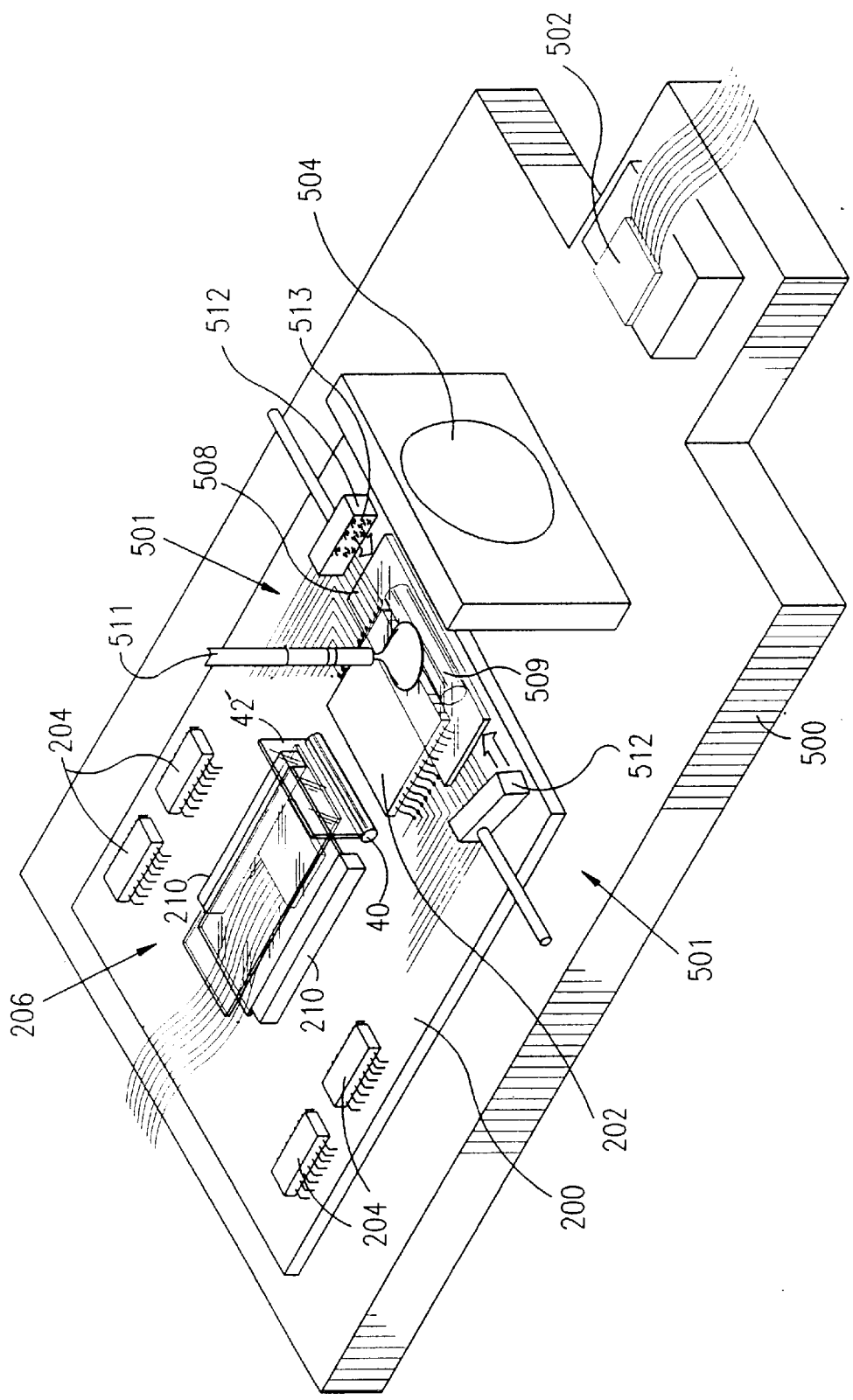

FIG. 6C illustrates precise mounting of the lens module 508 with respect to the active integrated optics waveguide device 202 of device 501. This construction ensures that the images of the centers of the ends of fibers of fiber bundle 502 lie in the same plane as the centers of the waveguides of waveguide device 202. This precise mounting is preferably achieved by using the positioner (not shown) to manipulate the lens module 508 relative to substrate 200 such that the mode of each optical fiber in bundle 502 matches the mode of at least one corresponding waveguide of waveguide device 202 with relatively low light loss.

The lens module 508 is mounted in a desired relative position on the substrate 200 independently of the positioner by employing side mounting blocks 512 to fix the module 508 in position on substrate 200 upon precise mutual alignment of the module 508 and the waveguide device 202.

Figure 6D:
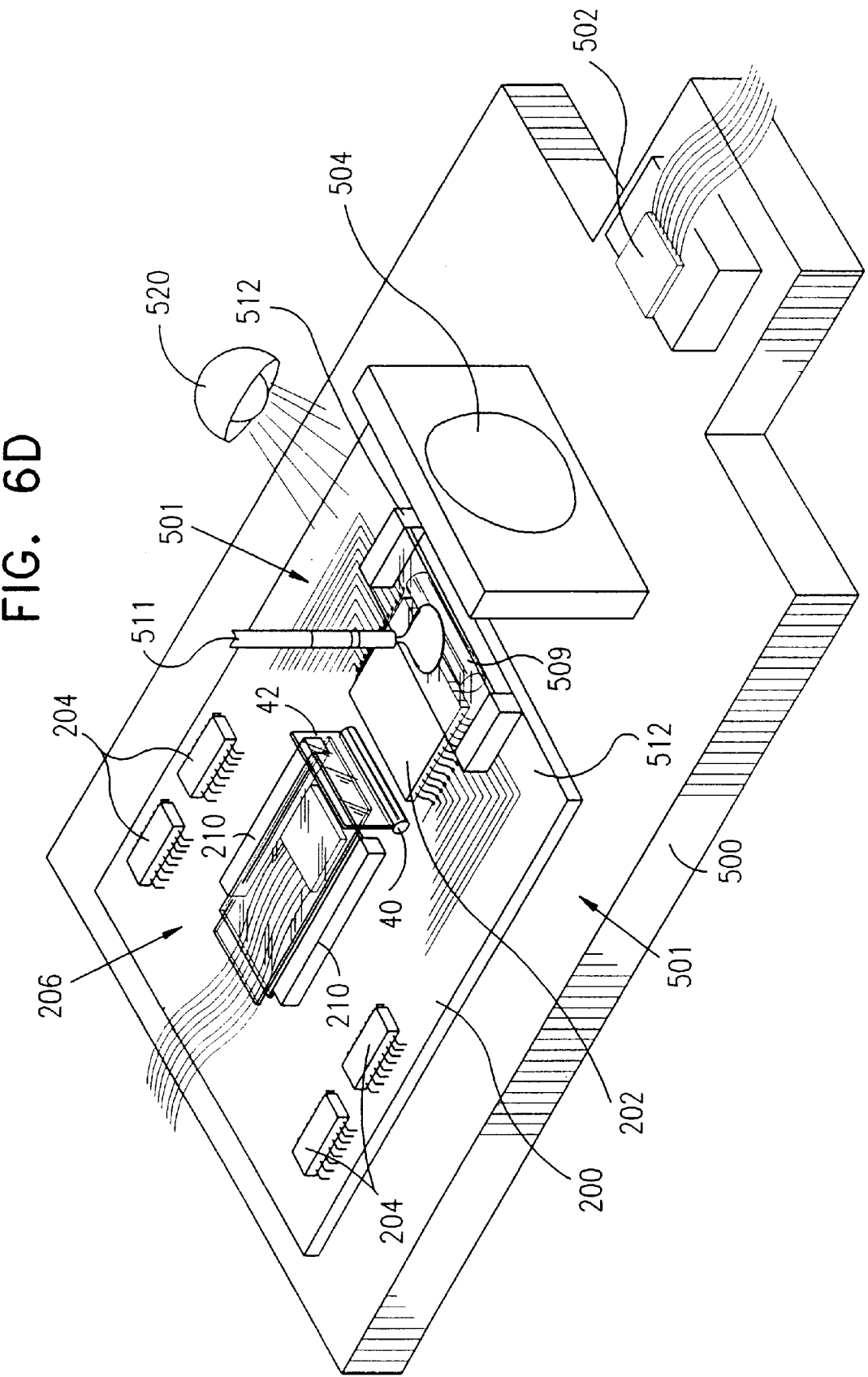
Figure 6E:
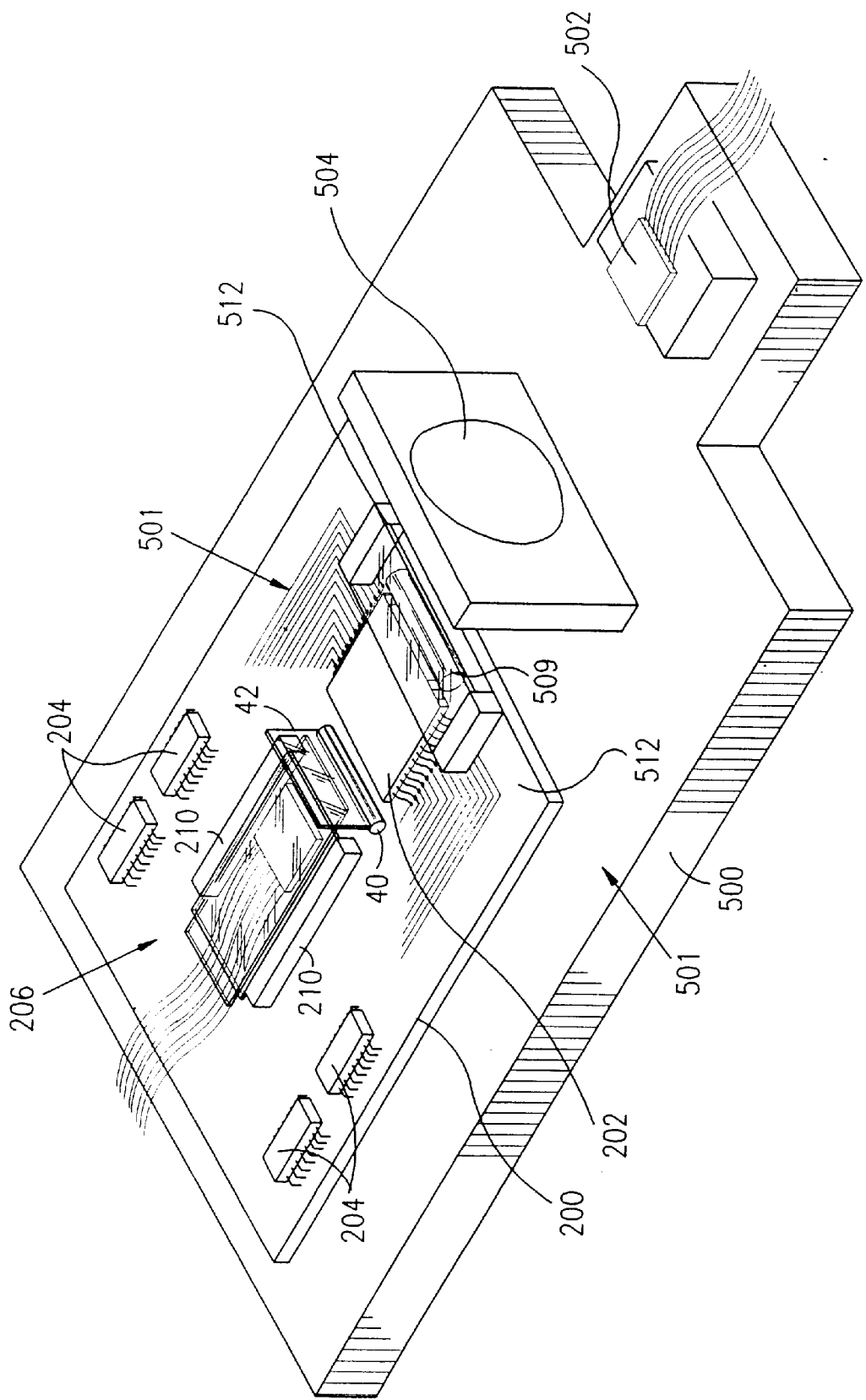

Preferably side mounting blocks 512 are carefully positioned alongside module 508 and are bonded thereto and to substrate 200, preferably using a thin layer of UV curable adhesive 513 which does not involve significant shrinkage during curing, as by use of a UV light source 520 as shown in FIG. 6D, so that the relative position shown in FIG. 6C is preserved, as seen in FIG. 6E.

The use of side mounting blocks 512 enables accurate fixation with six degrees of freedom by virtue of the use of the thin layer of adhesive 513, which does not involve significant shrinkage during curing, along two mutually orthogonal planes.

Reference is now made to FIGS. 7A–7D, which are simplified pictorial illustrations of a method for constructing an integrated optics optical fiber switch using a plurality of base substrates bearing integrated optics waveguide assemblies and optical fiber modules as shown in FIG. 3F.

Figure 7A:
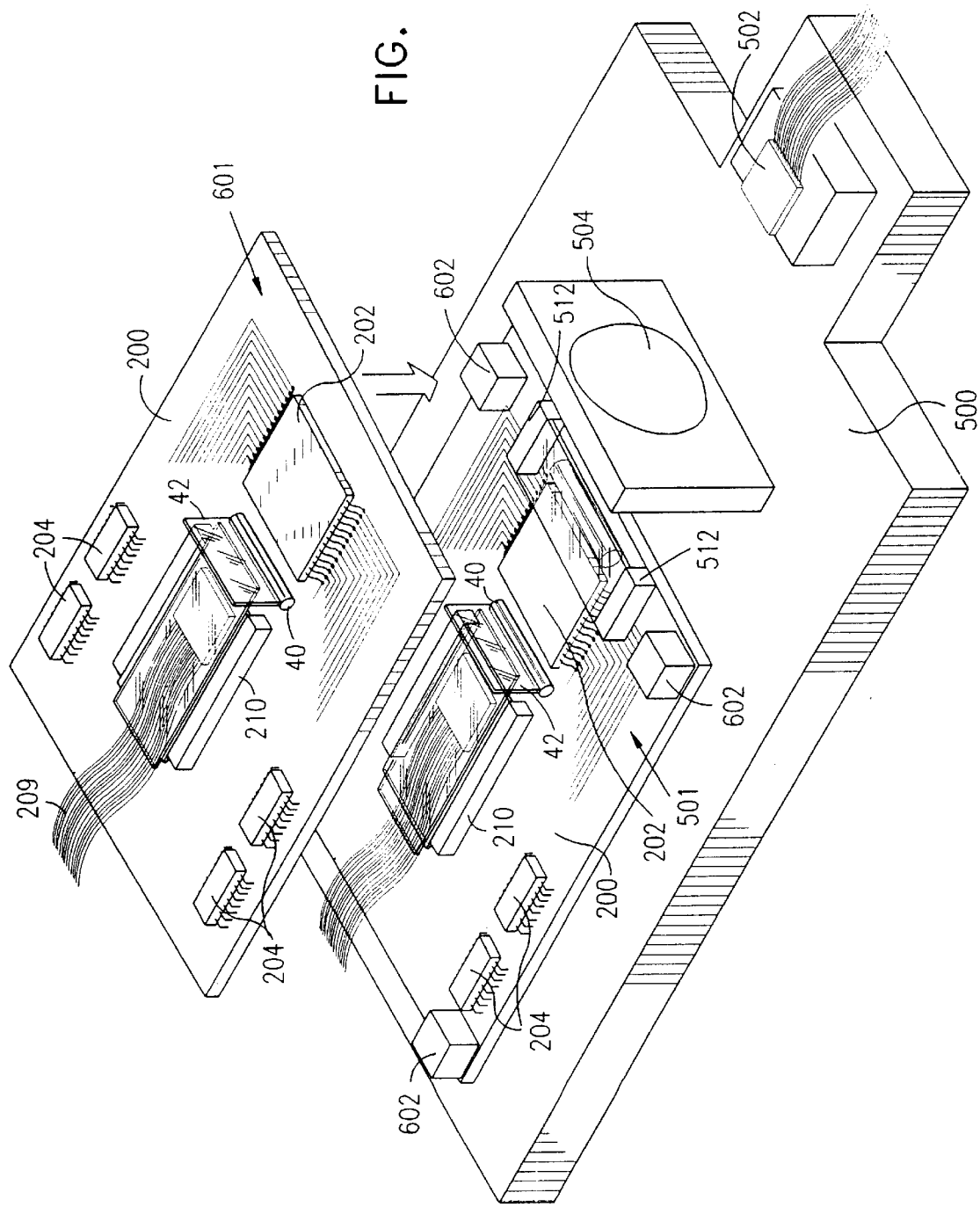
FIGS. 7A–7D are simplified pictorial illustrations of a method for constructing an integrated optics optical fiber switch using a plurality of base substrates bearing integrated optics waveguide assemblies and optical fiber modules as shown in FIG. 3F.

The switch is constructed on the basis of the apparatus shown in FIG. 6E. For the sake of conciseness and clarity, the reference numerals appearing in FIG. 6E are also employed, as appropriate in FIGS. 7A–7D. As seen in FIG. 7A an optical device 601, preferably identical to optical device 501 (FIG. 6E), as shown in FIG. 3F, is stacked over optical device 501 and spaced therefrom by mounting spacers 602. For the sake of conciseness and clarity, the reference numerals appearing in FIG. 3F are also employed, as appropriate in FIGS. 7A–7D. Spacers 602 may be mounted either on device 501 as shown or alternatively on device 601 or on chassis 500.

The alignment between devices 501 and 601 may be within conventional mechanical tolerances, such as 10 microns. The most important aspect of the alignment between devices 501 and 601 is the parallelism of the planes of the respective substrates 200 of devices 501 and 601 about the axes of the waveguides of respective optical devices 202.

Figure 7B:
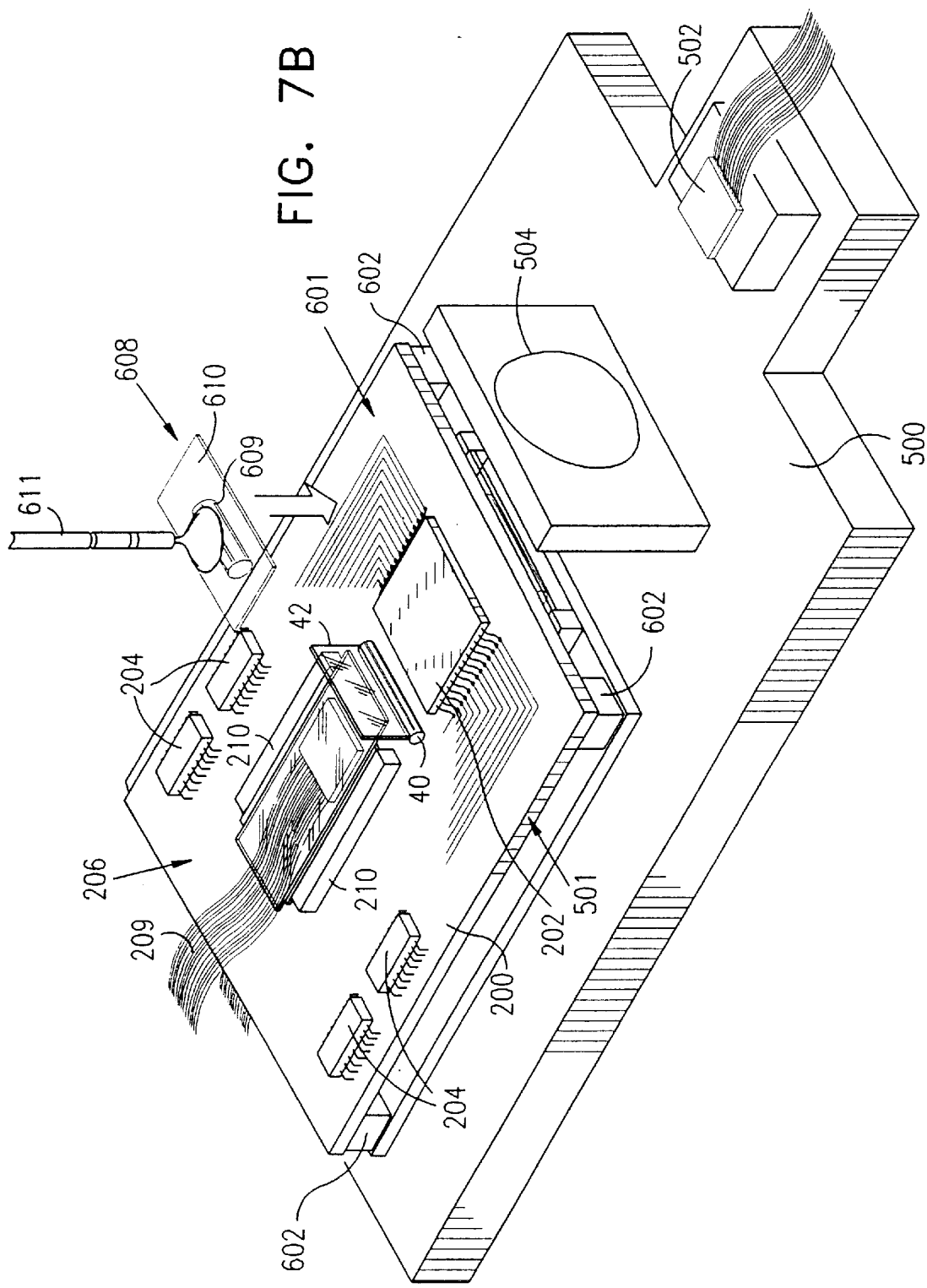

As seen in FIG. 7B, a lens module 608, preferably comprising a lens 609 fixedly mounted onto a mounting substrate 610, is brought into proximity with substrate 200 of device 601 and active integrated optics waveguide device 202 of device 601, as by a vacuum engagement assembly 611, connected to a suitable positioner (not shown), such as Melles Griot Nanoblock.

Figure 7C:
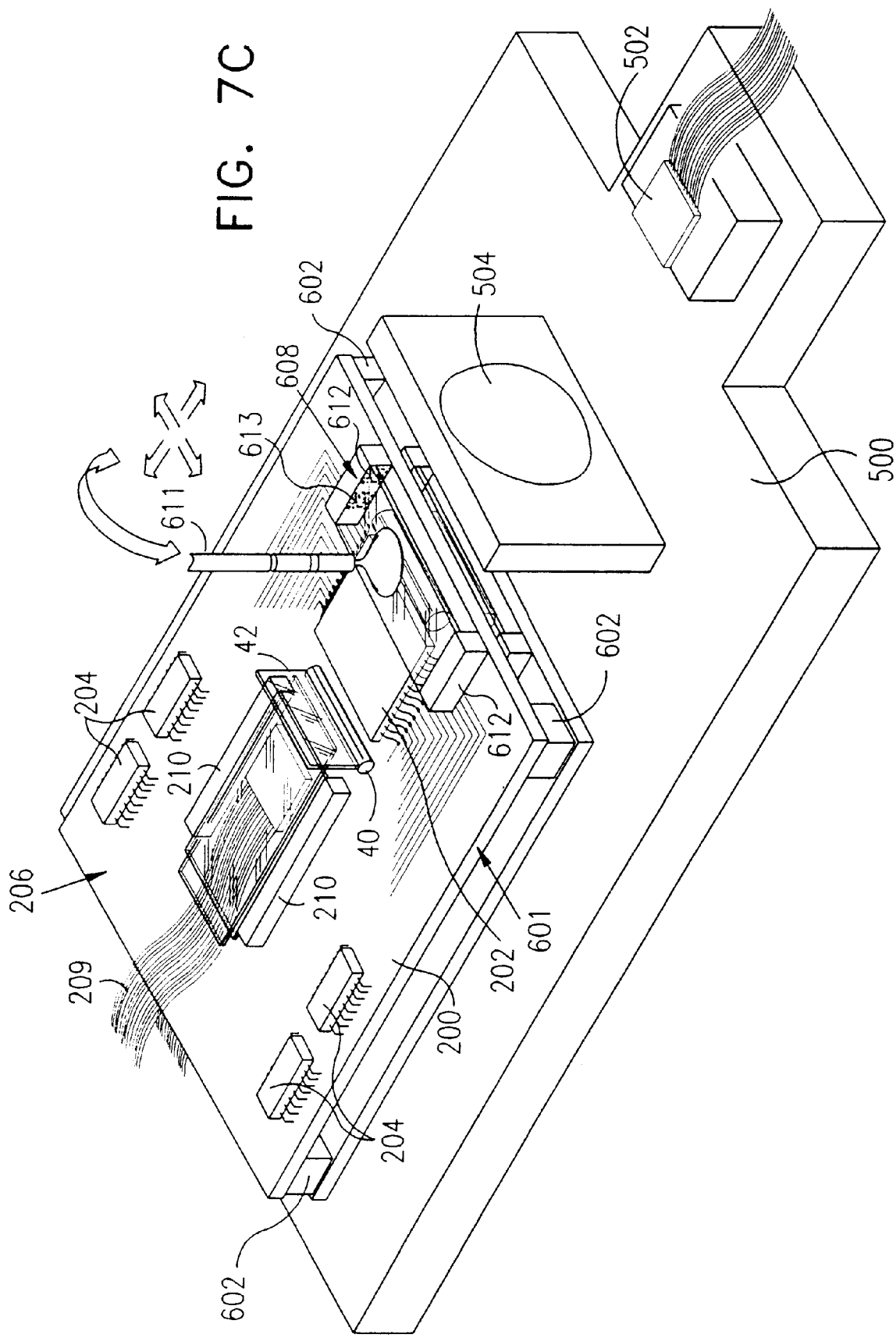

As seen in FIG. 7C, the lens module 608 is precisely positioned with respect to the active integrated optics waveguide device 202 of device 601 with six degrees of freedom so as to achieve a high degree of accuracy in order to realize optimal optical coupling efficiency between the fibers of fiber bundle 502 and the waveguides in device 202 of device 601. This degree of accuracy is greater than that required in the previously described alignment steps illustrated in FIGS. 1A–1I and preferably reaches one tenth of a micron.

Precise mounting of the lens module 608 with respect to the active integrated optics waveguide device 202 of device 601 as described hereinabove with respect to device 501 ensures that the images of the centers of the ends of fibers of fiber bundle 502 lie in the same plane as the centers of the waveguides of waveguide device 202 of device 601. This precise mounting is preferably achieved by using the positioner (not shown) to manipulate the lens module 608 relative to substrate 200 of device 601 such that the mode of each optical fiber in bundle 502 matches the mode of at least one corresponding waveguide of waveguide device 202 of device 601 with relatively low light loss.

Figure 7D:
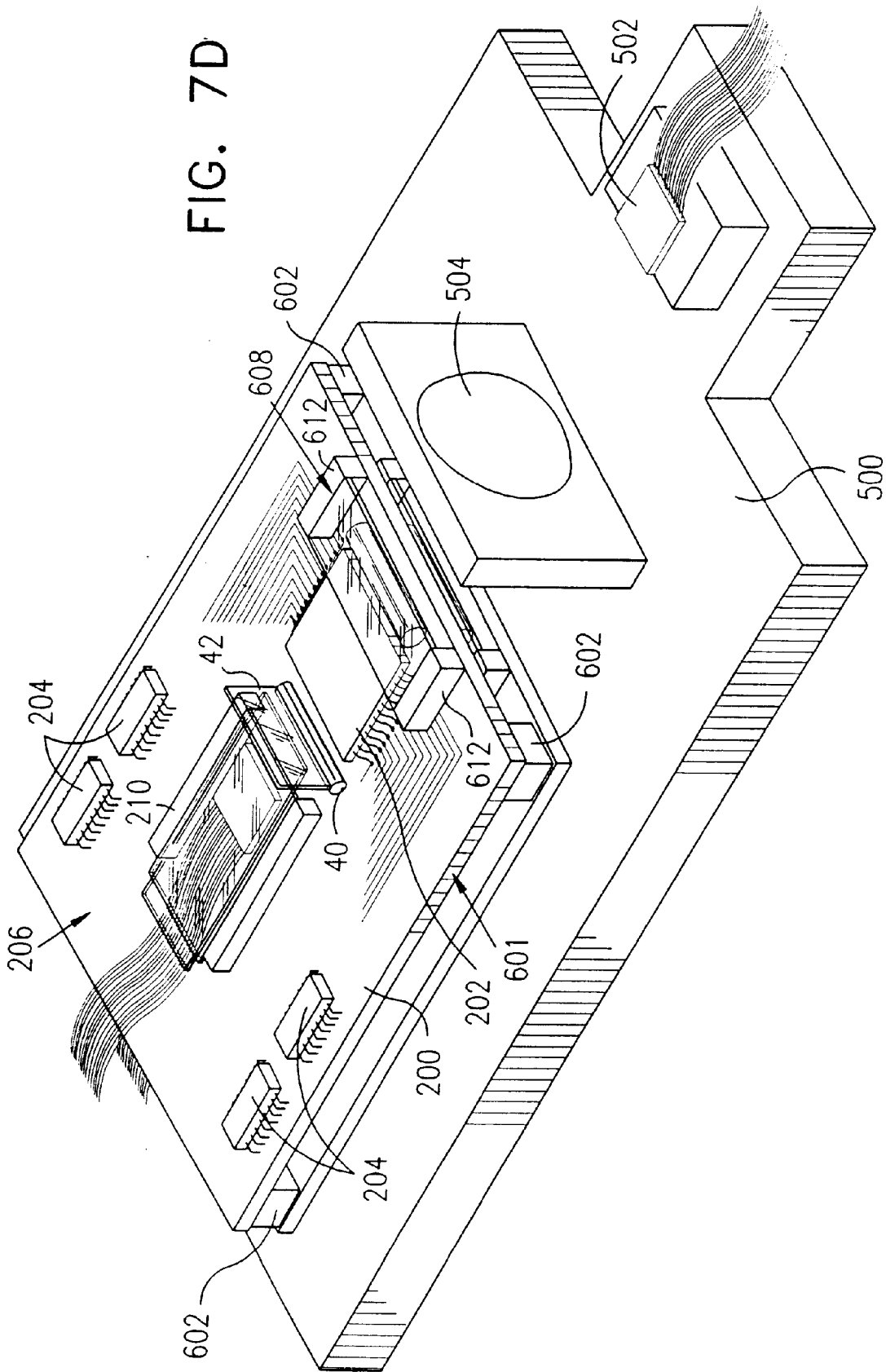

As seen in FIG. 7D, the lens module 608 is mounted in a desired relative position on the substrate 200 of device 601 independently of the positioner by employing side mounting blocks 612 to fix the module 608 in position on substrate 200 of device 601 upon precise mutual alignment of the module 608 and the waveguide device 202 of device 601.

Preferably side mounting blocks 612 are carefully positioned alongside module 608 and are bonded thereto and to substrate 200 of device 601, preferably using a thin layer of UV curable adhesive 613 which does not involve significant shrinkage during curing, as by use of a UV light source (not shown).

Reference is now made to FIGS. 8A–8D, which are simplified pictorial illustrations of a method for associating output optics with the optical device of FIG. 4F in accordance with a preferred embodiment of the present invention;

FIG. 8A shows a chassis 700 onto which is mounted an optical device 701, preferably the optical device described hereinabove and shown in FIG. 4F. For the sake of conciseness and clarity, the reference numerals appearing in FIG. 4F are employed also in FIG. 8A as appropriate. Also mounted on chassis 700 is an optical fiber bundle 702 and a lens 704 arranged such that the center of the lens 704 lies in the same plane as the centers of the ends of the fibers in fiber bundle 702 within conventional mechanical tolerances, such as 10–50 microns.

As seen in FIG. 8A, a lens module 708, preferably comprising a lens 709 fixedly mounted onto a mounting substrate 710, is brought into proximity with substrate 300 of device 701 and active integrated optics waveguide device 302 of device 701, as by a vacuum engagement assembly 711, connected to a suitable positioner (not shown), such as Melles Griot Nanoblock.

Figure 8B:
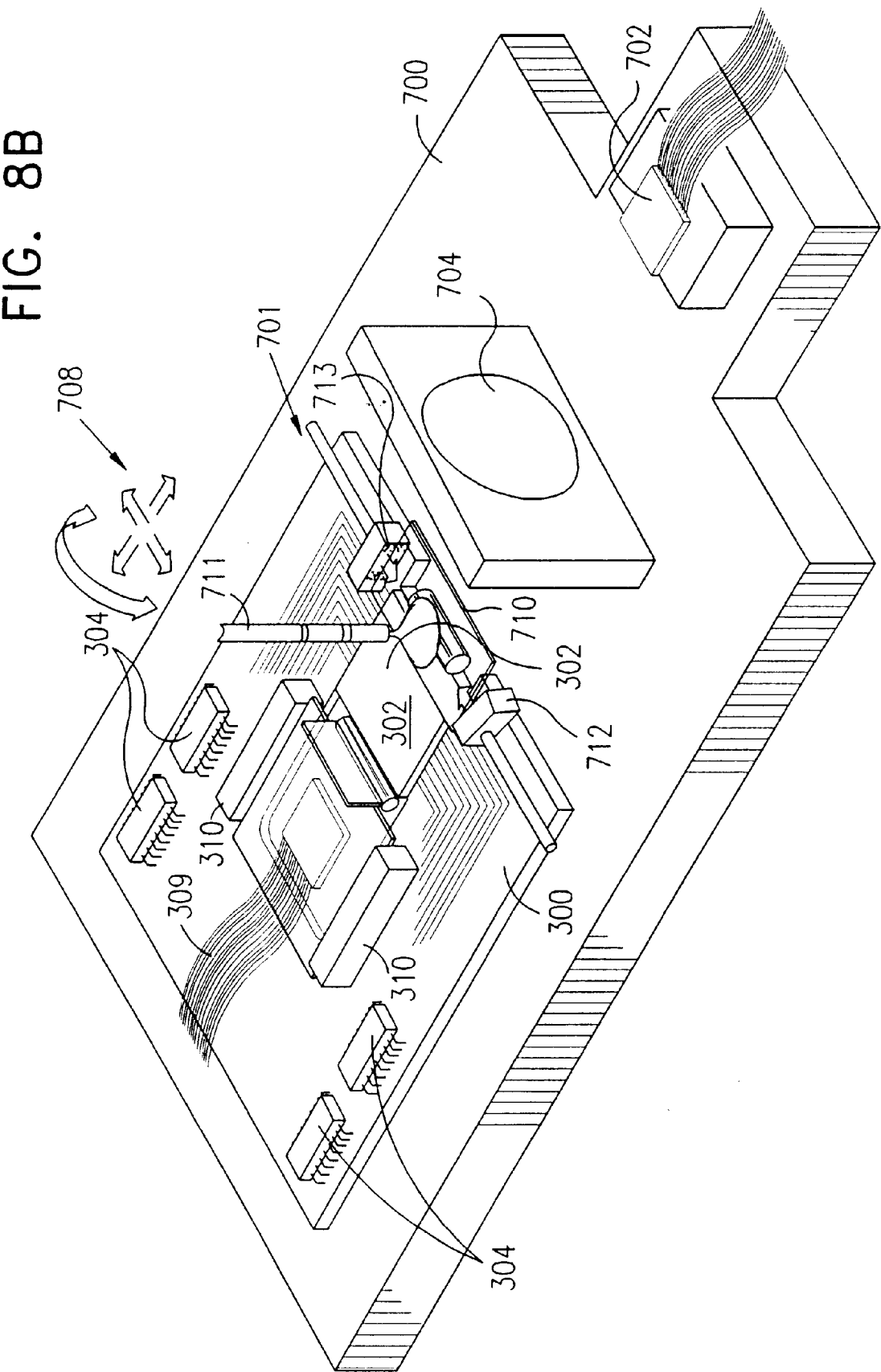

As seen in FIG. 8B, the lens module 708 is precisely positioned with respect to the active integrated optics waveguide device 302 with six degrees of freedom so as to achieve a high degree of accuracy in order to realize optimal optical coupling efficiency between the fibers of fiber bundle 702 and the waveguides in device 302. This degree of accuracy is greater than that required in the previously described alignment steps illustrated in FIGS. 1A–1I and preferably reaches one tenth of a micron.

Figure 8C:
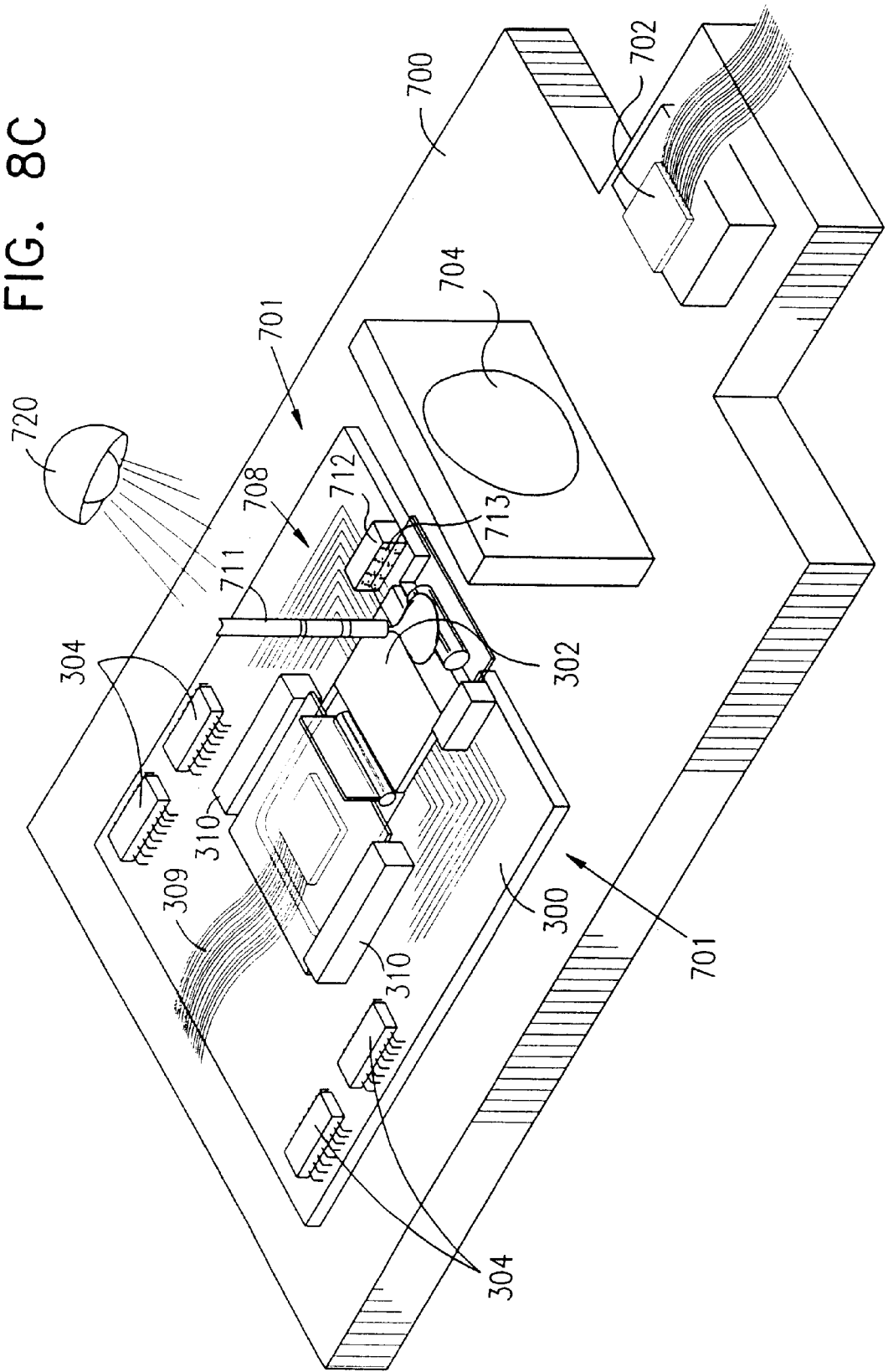

FIG. 8C illustrates precise mounting of the lens module 708 with respect to the active integrated optics waveguide device 302 of device 701. This construction ensures that the images of the centers of the ends of fibers of fiber bundle 702 lie in the same plane as the centers of the waveguides of waveguide device 302. This precise mounting is preferably achieved by using the positioner (not shown) to manipulate the lens module 708 relative to substrate 300 such that the mode of each optical fiber in bundle 702 matches the mode of at least one corresponding waveguide of waveguide device 302 with relatively low light loss.

The lens module 708 is mounted in a desired relative position on the substrate 300 independently of the positioner by employing side mounting blocks 712 to fix the module 708 in position on substrate 300 upon precise mutual alignment of the module 708 and the waveguide device 302.

Figure 8D:
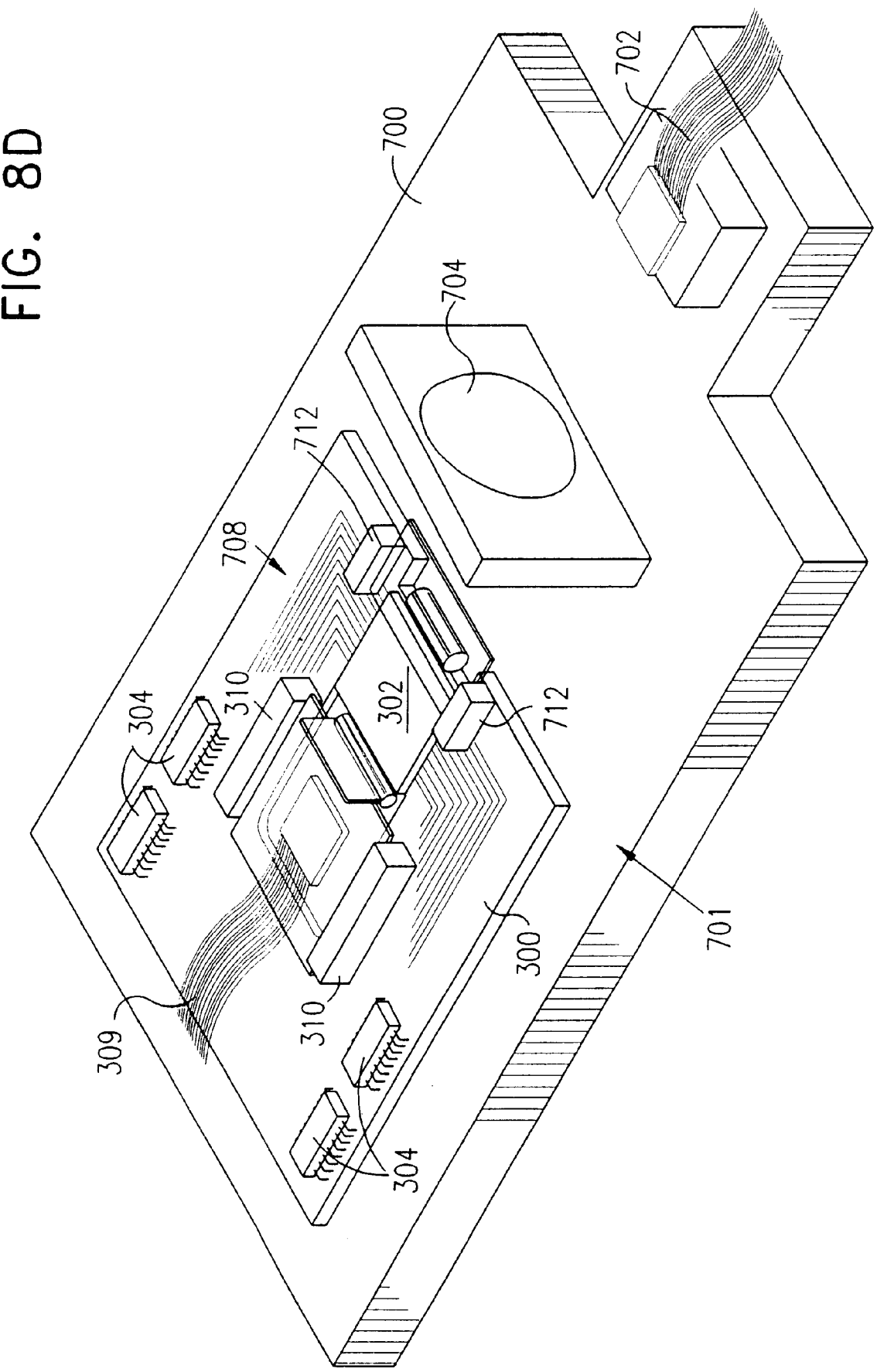

Preferably side mounting blocks 712 are carefully positioned alongside module 708 and are bonded thereto and to substrate 300, preferably using a thin layer of UV curable adhesive 713 which does not involve significant shrinkage during curing, as by use of a UV light source 720 as shown in FIG. 8C, so that the relative position shown in FIG. 8C is preserved, as seen in FIG. 8D.

The use of side mounting blocks 712 enables accurate fixation with six degrees of freedom by virtue of the use of the thin layer of adhesive 713, which does not involve significant shrinkage during curing, along two mutually orthogonal planes.

Reference is now made to FIGS. 9A–9D, which are simplified pictorial illustrations of a method for constructing an integrated optics optical fiber switch using a plurality of base substrates bearing integrated optics waveguide assemblies and optical fiber modules as shown in FIG. 4F.

Figure 9A:
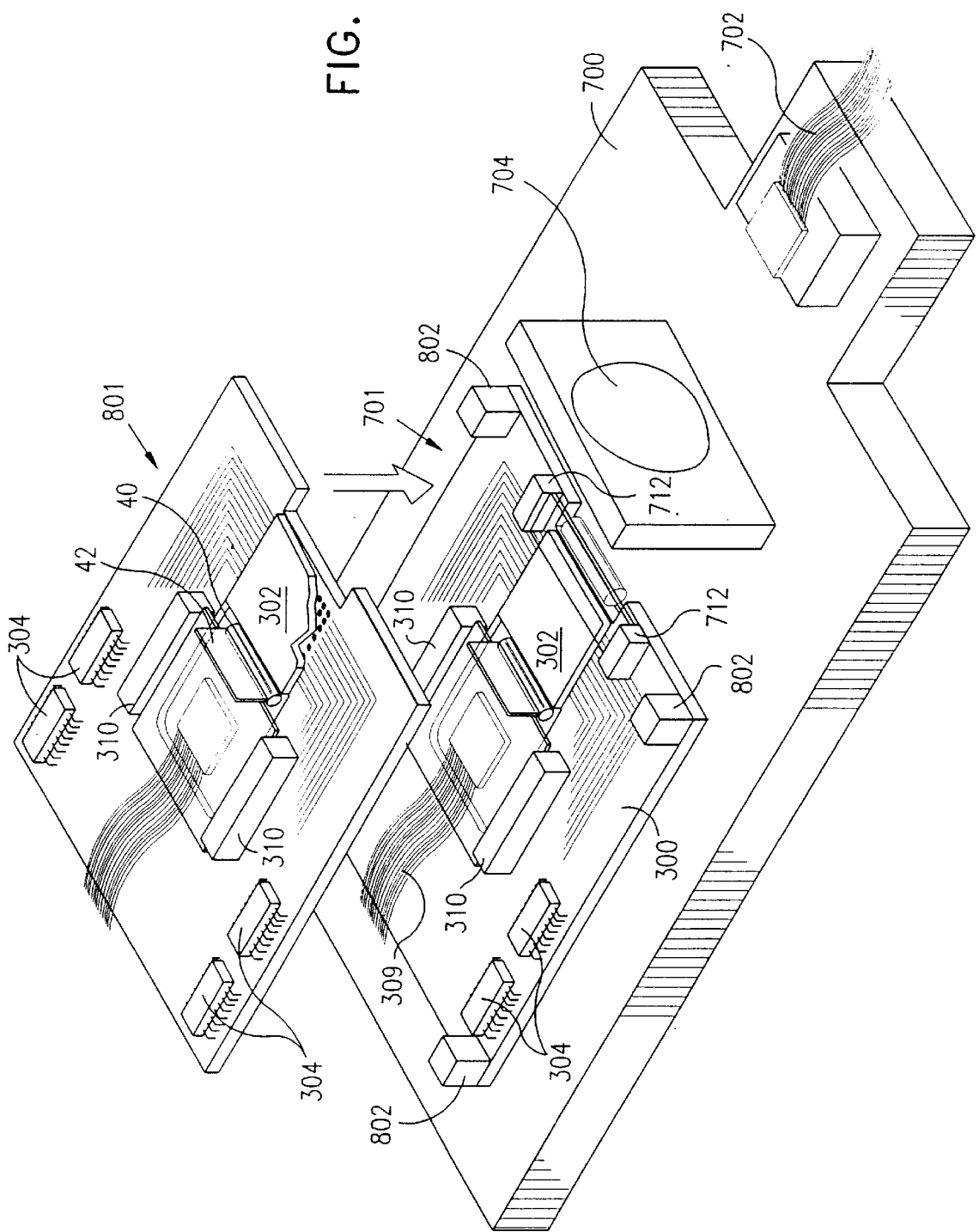
FIGS. 9A–9D are simplified pictorial illustrations of a method for constructing an integrated optics optical fiber switch using a plurality of base substrates bearing integrated optics waveguide assemblies and optical fiber modules as shown in FIG. 4F.

The switch is constructed on the basis of the apparatus shown in FIG. 8D. For the sake of conciseness and clarity, the reference numerals appearing in FIG. 8D are also employed, as appropriate in FIGS. 9A–9D. As seen in FIG. 9A an optical device 801, preferably identical to optical device 701 (FIG. 8D), as shown in FIG. 4F, is stacked over optical device 701 and spaced therefrom by mounting spacers 802. For the sake of conciseness and clarity, the reference numerals appearing in FIG. 4F are also employed, as appropriate in FIGS. 9A–9D. Spacers 802 may be may mounted either on device 701 as shown or alternatively on device 801 or on chassis 700.

Figure 9B:
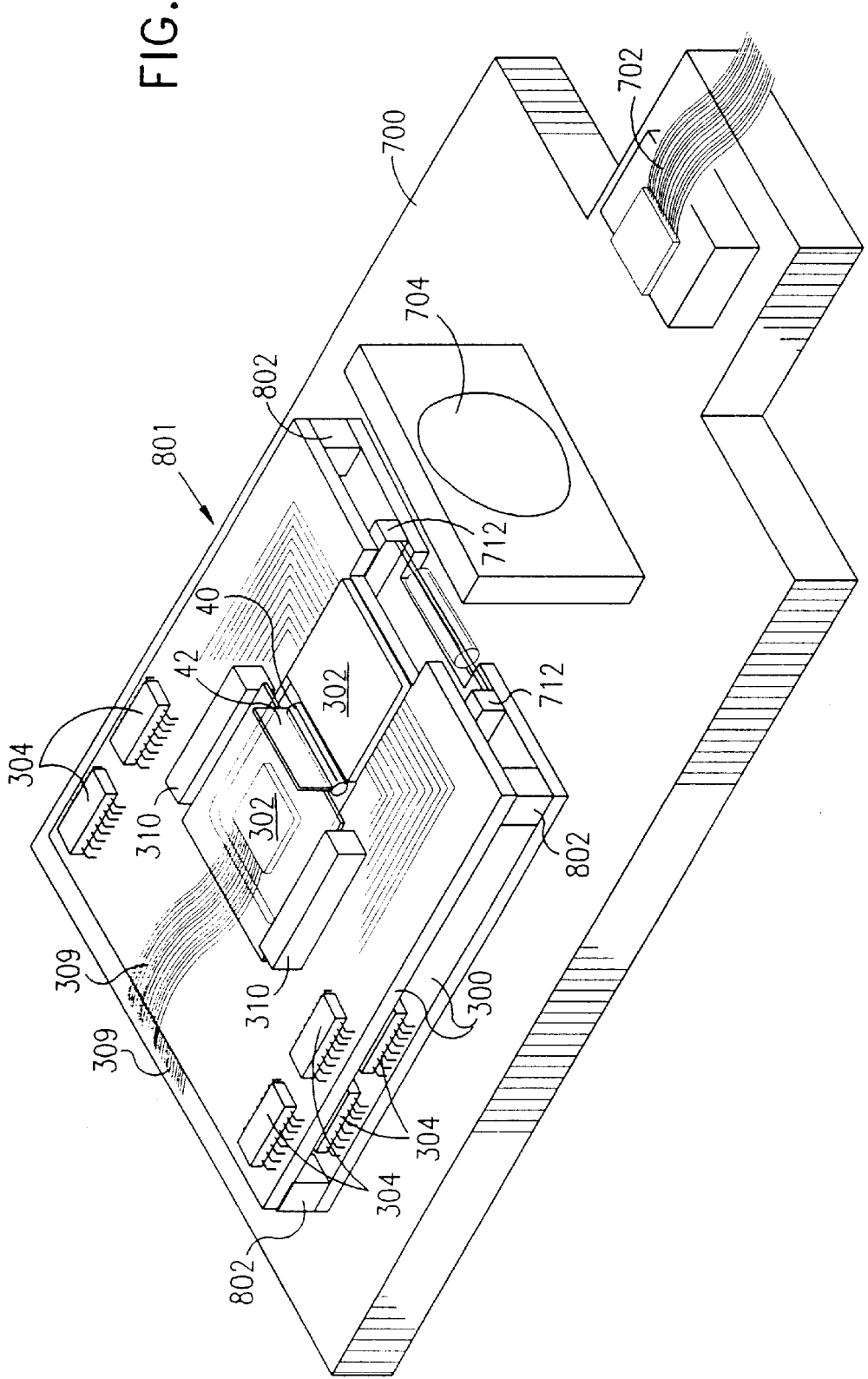

The alignment between devices 701 and 801 may be within conventional mechanical tolerances, such as 10 microns. The most important aspect of the alignment between devices 701 and 801 is the parallelism of the planes of the respective substrates 300 of devices 701 and 801 about the axes of the waveguides of respective optical devices 302 (FIG. 9B).

Figure 9C:
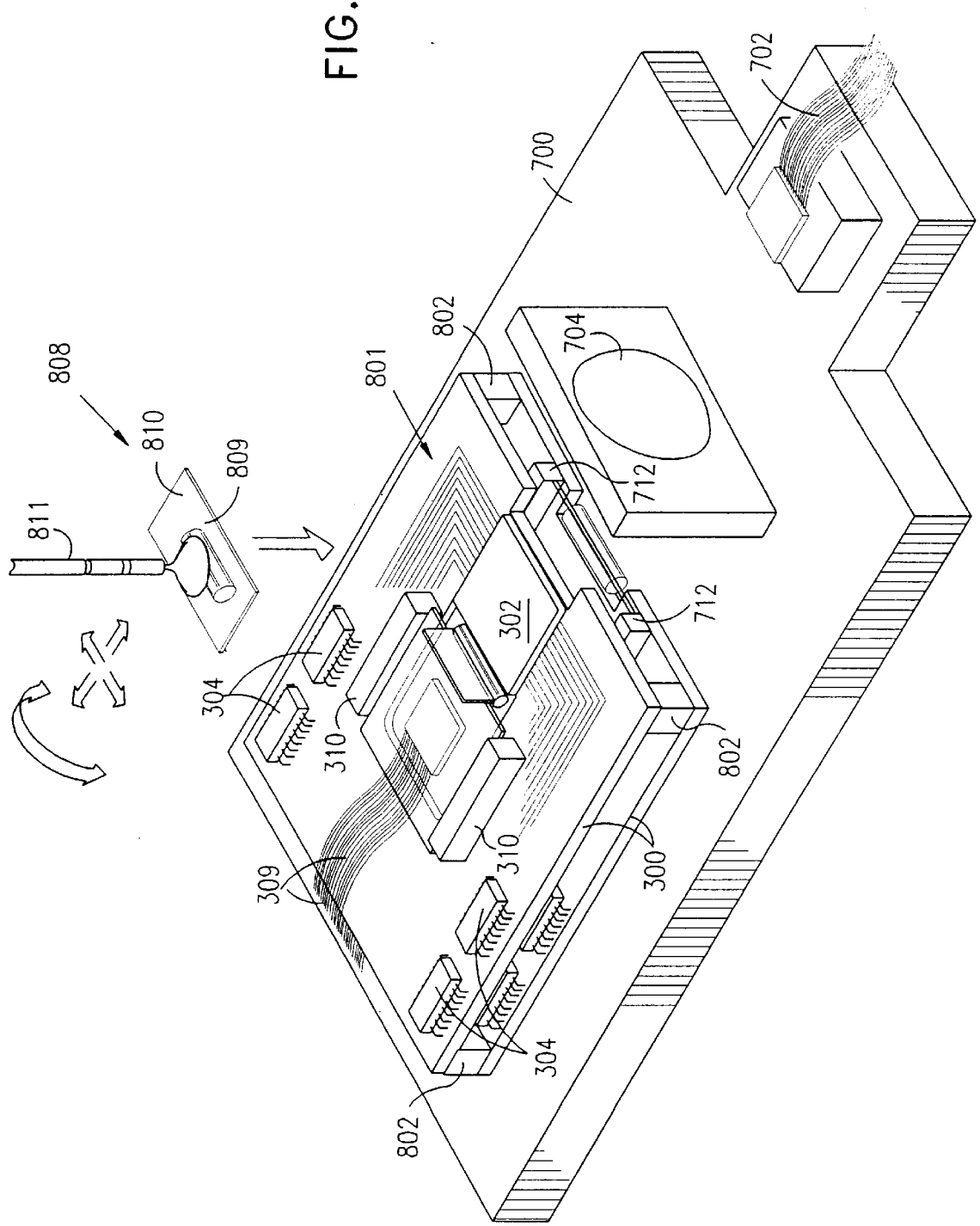

As seen in FIG. 9C, a lens module 808, preferably comprising a lens 809 fixedly mounted onto a mounting substrate 810, is brought into proximity with substrate 300 of device 801 and active integrated optics waveguide device 302 of device 801, as by a vacuum engagement assembly 811, connected to a suitable positioner (not shown), such as Melles Griot Nanoblock.

Also seen in FIG. 9C, the lens module 808 is precisely positioned with respect to the active integrated optics waveguide device 302 of device 801 with six degrees of freedom so as to achieve a high degree of accuracy in order to realize optimal optical coupling efficiency between the fibers of fiber bundle 702 and the waveguides in device 302 of device 801. This degree of accuracy is greater than that required in the previously described alignment steps illustrated in FIGS. 1A–1I and preferably reaches one tenth of a micron.

Precise mounting of the lens module 808 with respect to the active integrated optics waveguide device 302 of device 801 as described hereinabove with respect to device 701 ensures that the images of the centers of the ends of fibers of fiber bundle 702 lie in the same plane as the centers of the waveguides of waveguide device 302 of device 801. This precise mounting is preferably achieved by using the positioner (not shown) to manipulate the lens module 808 relative to substrate 300 of device 801 such that the mode of each optical fiber in bundle 702 matches the mode of at least one corresponding waveguide of waveguide device 302 of device 801 with relatively low light loss.

Figure 9D:
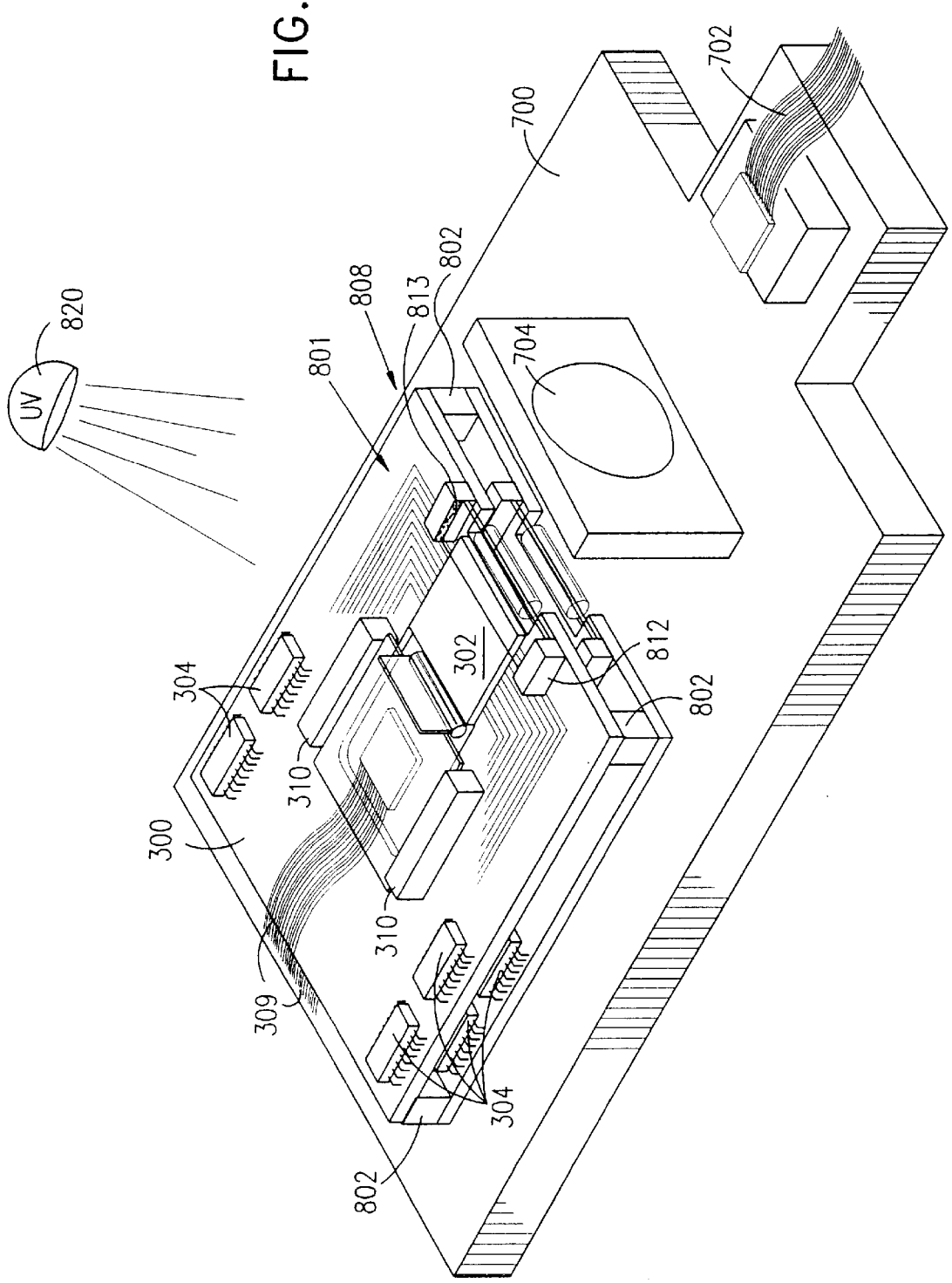

As seen in FIG. 9D, the lens module 808 is mounted in a desired relative position on the substrate 300 of device 801 independently of the positioner by employing side mounting blocks 812 to fix the module 808 in position on substrate 300 of device 801 upon precise mutual alignment of the module 808 and the waveguide device 302 of device 801.

Preferably side mounting blocks 812 are carefully positioned alongside module 808 and are bonded thereto and to substrate 300 of device 801, preferably using a thin layer of UV curable adhesive 813 which does not involve significant shrinkage during curing, as by use of a UV light source 820.

It will be appreciated by persons skilled in the art that the present invention is not limited by the claims which follow, rather the scope of the invention includes both combinations and subcombinations of the various features described hereinabove as well as variations and modifications thereof which would occur to a person of ordinary skill in the art upon reading the foregoing description and which are not in the prior art.

What is claimed is:

1. An optical device comprising:
   at least one optical substrate having formed thereon at least one waveguide having a center which lies in a waveguide plane;
   a base substrate onto which said at least one optical substrate is fixed and defining at least one optical fiber positioning groove;
   at least one optical fiber fixed in said at least one optical fiber positioning groove on said base substrate, whereby a center of said at least one optical fiber lies in a plane which is substantially coplanar with said waveguide plane; and
   at least one optical module, precisely positioned onto said base substrate and fixed thereto by means of side mounting blocks which are adhered to said at least one optical module by a thin layer of adhering material on a first surface of each of said side mounting blocks and are adhered to said at least one base substrate by a thin layer of adhering material at a second surface of each said side mounting blocks, said second surface being not parallel to said first surface, thereby to preserve precise mutual alignment of said at least one module and said at least waveguide.

2. An optical device according to claim 1 and also comprising electrical connections mounted on said base substrate.

3. An optical device according to claim 1 and wherein said at least one optical substrate is a light deflector.

4. An optical device according to claim 3 and also comprising electrical connections mounted on said base substrate.

* * * * *